(12) United States Patent
Zhang et al.

(10) Patent No.: US 12,040,959 B2
(45) Date of Patent: Jul. 16, 2024

(54) TRAFFIC MONITORING METHOD, APPARATUS, INTEGRATED CIRCUIT, NETWORK DEVICE, AND NETWORK SYSTEM

(71) Applicant: HUAWEI TECHNOLOGIES CO., LTD., Guangdong (CN)

(72) Inventors: Zhengyi Zhang, Chengdu (CN); Jing Hu, Beijing (CN); Feiran Yang, Beijing (CN); Haifeng Wu, Shenzhen (CN); Wei Song, Nanjing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 18/173,270

(22) Filed: Feb. 23, 2023

(65) Prior Publication Data

US 2023/0198873 A1 Jun. 22, 2023

Related U.S. Application Data

(63) Continuation of application No. PCT/CN2021/081656, filed on Mar. 19, 2021.

(30) Foreign Application Priority Data

Aug. 26, 2020 (CN) .......................... 202010873634.3
Nov. 6, 2020 (CN) .......................... 202011233448.X

(51) Int. Cl.
*G06F 15/16* (2006.01)
*H04L 43/062* (2022.01)
*H04L 43/08* (2022.01)

(52) U.S. Cl.
CPC ............ *H04L 43/08* (2013.01); *H04L 43/062* (2013.01)

(58) Field of Classification Search
CPC .............................. H04L 43/08; H04L 43/062
(Continued)

(56) References Cited

U.S. PATENT DOCUMENTS 7,644,157 B2 1/2010 Shomura et al.
8,059,559 B2 11/2011 Bugenhagen
(Continued)

FOREIGN PATENT DOCUMENTS

CN 101227348 A 7/2008
CN 101741739 A 6/2010
(Continued)

OTHER PUBLICATIONS

Wang Yang et al., Distributed and Parallel Construction Method of Equi-width Histogram in Cloud Database, Advanced Engineering Sciences, vol. 50, No. 2, Mar. 2018, with the English Abstract, 8 pages.

*Primary Examiner* — Moustafa M Meky
(74) *Attorney, Agent, or Firm* — WOMBLE BOND DICKINSON (US) LLP

(57) ABSTRACT

Embodiments of this application disclose a traffic monitoring method, an apparatus, an integrated circuit, a network device, and a network system. When receiving a first packet, a traffic collection apparatus determines that a measurement value of a target performance indicator of the first packet matches a value of first information in a first register, updates a value of second information in the first register based on the measurement value of the target performance indicator of the first packet, and increases a value of third information in the first register by 1.

30 Claims, 14 Drawing Sheets

(58) Field of Classification Search
USPC ........................................................ 370/252
See application file for complete search history.

(56) References Cited

U.S. PATENT DOCUMENTS

| | | | |
|---|---|---|---|
| 8,751,757 B1 | 6/2014 | Gaikwad et al. | |
| 9,148,359 B2 | 9/2015 | Kruger et al. | |
| 10,243,842 B2 | 3/2019 | Chu et al. | |
| 10,616,314 B1* | 4/2020 | Plenderleith | H04L 67/1027 |
| 10,965,559 B1* | 3/2021 | Bettaiah | G06F 16/24578 |
| 11,106,442 B1* | 8/2021 | Hsiao | H04L 67/02 |
| 11,201,798 B2* | 12/2021 | Zavesky | H04L 41/5009 |
| 11,206,205 B1* | 12/2021 | Gupta | H04L 41/0893 |
| 11,296,955 B1* | 4/2022 | Fletcher | G06F 3/0482 |
| 11,355,123 B2* | 6/2022 | Trim | G06N 5/01 |
| 11,374,776 B2* | 6/2022 | Guim Bernat | G06F 9/505 |
| 11,398,959 B2* | 7/2022 | Yelahanka Raghuprasad | H04L 43/08 |
| 11,616,713 B2* | 3/2023 | Gupta | H04L 43/04 709/220 |
| 11,777,826 B2* | 10/2023 | Zhang | H04L 41/142 709/224 |
| 11,825,332 B2* | 11/2023 | Schliwa-Bertling | H04L 41/5009 |
| 2007/0244864 A1 | 10/2007 | Musko | |
| 2007/0271374 A1 | 11/2007 | Shomura et al. | |
| 2008/0144523 A1 | 6/2008 | Nishi et al. | |
| 2010/0061266 A1 | 3/2010 | Bugenhagen | |
| 2012/0076044 A1 | 3/2012 | Bugenhagen | |
| 2013/0163446 A1 | 6/2013 | Kruger et al. | |
| 2017/0019340 A1 | 1/2017 | Compton et al. | |
| 2017/0131936 A1 | 5/2017 | Parra | |
| 2018/0088947 A1 | 3/2018 | Landheer | |
| 2022/0052927 A1* | 2/2022 | Yelahanka Raghuprasad | H04L 41/5025 |
| 2022/0086698 A1* | 3/2022 | Yao | H04W 24/08 |
| 2022/0191733 A1* | 6/2022 | Ali | H04W 4/46 |
| 2022/0321435 A1* | 10/2022 | Yao | H04W 24/08 |
| 2023/0100246 A1* | 3/2023 | DeBates | H04N 7/14 705/2 |

FOREIGN PATENT DOCUMENTS

| | | |
|---|---|---|
| CN | 101803313 A | 8/2010 |
| CN | 104283699 A | 1/2015 |
| CN | 105281969 A | 1/2016 |
| CN | 105608050 A | 5/2016 |
| CN | 106789450 A | 5/2017 |
| CN | 107852364 A | 3/2018 |
| CN | 109962832 A | 7/2019 |
| CN | 110087261 A | 8/2019 |
| CN | 110535825 A | 12/2019 |
| CN | 110768856 A | 2/2020 |
| WO | 2013139363 A1 | 9/2013 |

* cited by examiner

TRAFFIC MONITORING METHOD, APPARATUS, INTEGRATED CIRCUIT, NETWORK DEVICE, AND NETWORK SYSTEM

CROSS-REFERENCE TO RELATED APPLICATIONS

This application is a continuation of International Application No. PCT/CN2021/081656, filed on Mar. 19, 2021, which claims priority to Chinese Patent Application No. 202010873634.3, filed on Aug. 26, 2020, and Chinese Patent Application No. 202011233448.X, filed on Nov. 6, 2020. All of the aforementioned patent applications are hereby incorporated by reference in their entireties.

TECHNICAL FIELD

This application relates to the field of communication technologies, and in particular, to a traffic monitoring method, an apparatus, an integrated circuit, a network device, and a network system.

BACKGROUND

In a network operating process, distribution of values of a performance indicator, for example, a packet latency or a chip port queue length, can reflect a network operating status. All the values of the performance indicator are stored, so that the distribution of the values can be accurately calculated. However, a large quantity of storage resources need to be occupied in this manner. To reduce a storage requirement, distribution of values of various performance indicators is roughly collected through histogram statistics.

In a histogram statistics algorithm, a value range corresponding to each performance indicator needs to be preset and equally divided into corresponding data buckets. This is complex in configuration. In addition, for different data streams or different phases of a same data stream, it cannot be ensured whether the configured value range and division into depths of the data buckets are appropriate, leading to poor statistical precision.

SUMMARY

Based on this, embodiments of this application provide a traffic monitoring method, an apparatus, an integrated circuit, a network device, and a network system, to simply and accurately collect statistics on various performance indicators of a received packet. In this way, an actual status of the network device can be accurately reflected by using a small quantity of storage resources.

According to a first aspect, an embodiment of this application provides a traffic monitoring method. For example, the method includes: When receiving a first packet, a traffic collection apparatus may determine that a measurement value of a target performance indicator of the first packet matches a value of first information in a first register. Therefore, the traffic collection apparatus updates a value of second information in the first register based on the measurement value of the target performance indicator of the first packet, and increases a value of third information in the first register by 1. The first register further includes the second information and the third information. The first information in the first register indicates a depth of a data bucket carrying a measurement value of the target performance indicator of a monitored packet, the second information in the first register indicates an accumulated sum of the measurement value that is of the target performance indicator of the monitored packet and that matches the value of the first information in the first register, and the third information in the first register indicates a quantity of packets, in one or more packets received by the traffic collection apparatus, whose measurement values of the target performance indicator match the value of the first information in the first register. In this way, a value range of a to-be-monitored performance indicator (namely, the target performance indicator) does not need to be configured, and the value range does not need to be equally divided to determine a depth of each data bucket either. Instead, the first information indicating the depth of the data bucket that carries the measurement value of the target performance indicator of the monitored packet, the second information indicating the accumulated sum of the measurement value that is of the target performance indicator of the monitored packet and that matches a value of the first information in each register, and the third information indicating a quantity of packets, in the received packet, that match the value of the first information in each register are used as three statistical parameters of the register, to match a measurement value of the target performance indicator of the received packet with the value of the first information in each register, and flexibly update values of the two statistical parameters, namely, the second information and the third information, in a matched register, so that statistics on the target performance indicator are collected. This not only reduces configuration workload for collecting the statistics on the target performance indicator, but also makes it possible to obtain a more comprehensive and accurate statistical result because an entire statistical value range and a statistical value sub-range of each register are not limited.

It should be noted that, in the method provided in this embodiment of this application, a quantity of registers in the traffic collection apparatus has slight impact on accuracy of the statistical result. Therefore, the statistics on the performance indicator of a network device can be precisely collected without excessive hardware resources.

That a traffic collection apparatus determines that a measurement value of a target performance indicator of the first packet matches a value of first information in a first register may include: The traffic collection apparatus determines that the measurement value of the target performance indicator of the first packet falls within a value range corresponding to the value of the first information in the first register. Alternatively, that a traffic collection apparatus determines that a measurement value of a target performance indicator of the first packet matches a value of first information in a first register may include: The traffic collection apparatus determines that a difference between the measurement value of the target performance indicator of the first packet and the value of the first information in the first register is less than a difference between the measurement value of the target performance indicator of the first packet and a value of the first information in another register.

In an embodiment, that the traffic collection apparatus updates a value of second information in the first register based on the measurement value of the target performance indicator of the first packet may specifically include: The traffic collection apparatus adds the measurement value of the target performance indicator of the first packet and the value not updated of the second information in the first register, to obtain an updated value of the second information. The traffic collection apparatus replaces the value not updated of the second information in the first register with the updated value of the second information. In this way, statistics on the measurement value of the target performance indicator of the packet may be collected by using the register that matches the measurement value of the target performance indicator, so that the traffic collection apparatus can monitor the received packet more accurately.

In an embodiment, the method may further include: The traffic collection apparatus sends a monitoring result to a control apparatus. In a case, the monitoring result may include the value of the second information in the first register and the value of the third information in the first register. In this case, the control apparatus may calculate, based on the value of the second information in the first register and the value of the third information in the first register that are in the received monitoring result, a value that is of fourth information and that corresponds to the first register, and process monitoring data based on the value of the third information and the value of the fourth information. In another case, the monitoring result alternatively includes a value that is of fourth information and that corresponds to the first register and the value of the third information in the first register, to be specific, the traffic collection apparatus calculates the value of the fourth information based on the value of the second information and the value of the third information in the first register, and sends the value of the third information and the value of the fourth information to the control apparatus. The fourth information indicates an average carrying the measurement value of the target performance indicator of the monitored packet. For example, the value of the fourth information may be equal to a quotient obtained by dividing the value of the second information by the value of the third information.

In an embodiment, the traffic collection apparatus may periodically send the monitoring result to the control apparatus.

In another embodiment, the traffic collection apparatus may alternatively send the monitoring result to the control apparatus when determining that the value of the third information in the first register is greater than a first threshold. The first threshold is a preset threshold, or is a preset proportion of a sum of values of the third information in all registers of the traffic collection apparatus.

In still another embodiment, the traffic collection apparatus may alternatively send the monitoring result to the control apparatus when determining that a sum of values of the third information in all registers of the traffic collection apparatus is greater than a second threshold.

In yet another embodiment, the traffic collection apparatus may alternatively send the monitoring result to the control apparatus based on a query request sent by the control apparatus, where the query request indicates the traffic collection apparatus to send the monitoring result to the control apparatus. In a case, the control apparatus may periodically send the query request to the traffic collection apparatus. A periodicity may be fixed, or may be dynamically adjusted based on a status of monitoring data received by the control apparatus last time. This is not limited in this embodiment of this application.

In an embodiment, after sending the monitoring result to the control apparatus, the traffic collection apparatus may clear the value of the second information and the value of the third information in the first register.

In an embodiment, the monitoring result sent by the traffic collection apparatus to the control apparatus can be used by the control apparatus to calculate an updated value that is of the first information and that corresponds to each register in the traffic collection apparatus. In this way, after the control apparatus calculates an updated value that is of the first information and that corresponds to the first register, the method may further include: The traffic collection apparatus receives the value sent by the control apparatus that is of the first information and that corresponds to the first register. The traffic collection apparatus updates the value of the first information in the first register based on the received value that is of the first information and that corresponds to the first register. In this way, the control apparatus calculates, based on all current monitoring data, the value that is of the first information and that corresponds to each register, so that the traffic collection apparatus can collect statistics on the packet in each register based on a most appropriate value of the first information, to improve precision of monitoring the target performance indicator.

In an embodiment, initially, the value of the first information in each register configured to store the monitoring result of the target performance indicator may be configured by a user, may be a random initial value automatically configured by a system, or may be determined through monitoring on the received packet. For example, when receiving a second packet, the traffic collection apparatus determines that the traffic collection apparatus includes a second register. A value of the second information and a value of the third information in the second register are both 0. This indicates that the second register is empty. In this case, in response to a case in which the traffic collection apparatus determines that the traffic collection apparatus includes the empty second register, the traffic collection apparatus updates a value of the first information in the second register to a measurement value of the target performance indicator of the second packet, updates the value of the second information in the second register to the measurement value of the target performance indicator of the second packet, and increases the value of the third information in the second register by 1.

In this embodiment of this application, the target performance indicator includes any one of the following indicators: a latency, a packet length, a packet receiving time interval, or queue usage.

In this embodiment of this application, the traffic collection apparatus is included in a processing chip, for example, may be integrated into a network processor (NP) chip.

According to a second aspect, an embodiment of this application further provides a traffic monitoring method. For example, the method may include: After receiving a plurality of monitoring results sent by a traffic collection apparatus, a control apparatus determines a plurality of values of first information based on the plurality of monitoring results, where the plurality of values of the first information correspond one-to-one to a plurality of registers in the traffic collection apparatus. Therefore, the control apparatus sends the plurality of values of the first information to the traffic collection apparatus, where the plurality of values of the first information are for updating values of the first information in the plurality of registers in the traffic collection apparatus. Each of the plurality of monitoring results is determined by the traffic collection apparatus based on a value of second information and a value of third information in the register included in the traffic collection apparatus. The register further includes the first information. The first information indicates a depth of a data bucket carrying a measurement value of a target performance indicator of a monitored packet, the second information indicates an accumulated sum of the measurement value that is of the target performance indicator of the monitored packet and that matches a value of the first information in the register, and the third information indicates a quantity of packets, in one or more packets received by the traffic collection apparatus, whose measurement values of the target performance indicator match the value of the first information in the register. In this way, the traffic collection apparatus does not need to configure a value range of a to-be-monitored performance indicator (namely, the target performance indicator), and does not need to equally divide the value range to determine a depth of each data bucket either. Instead, the traffic collection apparatus uses, as three statistical parameters of the register, the first information indicating the depth of the data bucket that carries the measurement value of the target performance indicator of the monitored packet, the second information indicating the accumulated sum of the measurement value that is of the target performance indicator of the monitored packet and that matches the value of the first information in each register, and the third information indicating the quantity of packets, in the received packet, that match the value of the first information in each register, to match a measurement value of the target performance indicator of the received packet with the value of the first information in each register, and flexibly update values of the two statistical parameters, namely, the second information and the third information, in a matched register, so that statistics on the target performance indicator are collected. This not only reduces configuration workload for collecting statistics on the target performance indicator, but also makes it possible to obtain a more comprehensive and accurate statistical result because an entire statistical value range and a statistical value sub-range of each register are not limited. In addition, the traffic collection apparatus further obtains the monitoring result for each register based on the value of the second information and the value of the third information, and sends the monitoring results to the control apparatus in batches, so that the control apparatus obtains, based on precise monitoring data, a more appropriate new value that is of the first information and that corresponds to each register, and indicates the traffic collection apparatus to continue to complete monitoring by using the new value of the first information. In such virtuous cycle, it is possible to implement precise monitoring by using the traffic monitoring method.

It should be noted that, in the method, a quantity of registers participating in statistics collection does not need to be as large as possible in the traffic collection apparatus, because the registers send the phase-based monitoring results to the control apparatus in batches for processing and storage. The method implements, through a combination of software and hardware, higher resource utilization and a more accurate statistical effect than a manner in which only a software algorithm is used for histogram statistics. It can be learned that the method achieves a more prominent effect in a case in which a network device has a small quantity of available registers but has a high precision requirement on the monitoring result.

In an embodiment, that a control apparatus receives a plurality of monitoring results sent by a traffic collection apparatus may include, for example: The control apparatus receives a first monitoring result corresponding to a first register that is sent by the traffic collection apparatus, where the first monitoring result includes a value that is of fourth information and that corresponds to the first register and a value of the third information, the value of the fourth information is calculated by the traffic collection apparatus based on a value of the second information in the first register and the value of the third information in the first register, and the fourth information indicates an average carrying a measurement value of the target performance indicator of a monitored packet.

In an embodiment, that a control apparatus receives a plurality of monitoring results sent by a traffic collection apparatus may alternatively include, for example: The control apparatus receives a first monitoring result corresponding to a first register that is sent by the traffic collection apparatus, where the first monitoring result includes a value of the second information in the first register and a value of the third information in the first register. In this case, before that a control apparatus determines a plurality of values of first information based on the plurality of monitoring results, the method may further include: The control apparatus calculates, based on the value of the second information and the value of the third information in the first register, a value that is of fourth information and that corresponds to the first register, where the fourth information indicates an average carrying a measurement value of the target performance indicator of a monitored packet.

In an embodiment, that a control apparatus determines a plurality of values of first information based on the plurality of monitoring results includes: The control apparatus determines, based on the value that is of the fourth information and that corresponds to the first register and the value of the third information in the first register, the plurality of values of the first information that correspond to the registers in the traffic collection apparatus.

In an example, that a control apparatus determines a plurality of values of first information based on the plurality of monitoring results may include: The control apparatus obtains N pieces of updated monitoring data based on N monitoring results and historical monitoring data, where N is a positive integer, and is a quantity of registers included in the traffic collection apparatus. The control apparatus determines an $i^{th}$ piece of updated monitoring data corresponding to an $i^{th}$ register in the N pieces of updated monitoring data, where i is an integer greater than or equal to 1 and less than or equal to N. The control apparatus denotes a value of the first information and in the $i^{th}$ piece of updated monitoring data as a value that is of the first information and that corresponds to the $i^{th}$ register. For example, N groups of new monitoring data are obtained based on received N groups of monitoring results and locally stored M groups of historical monitoring data, and values in the N groups of new monitoring data are sorted in ascending order, where the $i^{th}$ register corresponds to the $i^{th}$ piece of updated monitoring data, so that the value of the first information and in the $i^{th}$ piece of updated monitoring data is denoted as the value that is of the first information and that corresponds to the $i^{th}$ register. In this way, the traffic collection apparatus performs more accurate batch statistics collection subsequently. N may be a quantity of registers included in the traffic collection apparatus that are configured to store the monitoring result of the target performance indicator, for example, N=4. M is a quantity of groups of monitoring data stored in the control apparatus, for example, M=20. The monitoring data may be combined, for example, in a summation manner, an averaging manner, or a weighted averaging manner. This is not specifically limited in embodiments of this application.

In an embodiment, the method may further include: The control apparatus updates the historical monitoring data based on the plurality of monitoring results and the historical monitoring data. For example, the control apparatus may obtain M groups of new monitoring data based on the received N groups of monitoring results and the locally stored M groups of historical monitoring data. The M groups of new monitoring data are stored in the control apparatus, are processed with N groups of monitoring results received in batches next time, and are used as latest data for analyzing the target performance indicator of the network device in which the traffic collection apparatus is located.

In an embodiment, the method may further include: The control apparatus determines probability distribution of the target performance indicator based on currently stored monitoring data. For example, as required, the control apparatus may analyze and determine the probability distribution of the target performance indicator based on the stored M groups of monitoring data, to learn of the target performance indicator of the network device in which the traffic collection apparatus is located.

In an embodiment, before receiving the plurality of monitoring results sent by the traffic collection apparatus, the control apparatus may further send a query request to the traffic collection apparatus, where the query request indicates the traffic collection apparatus to send the monitoring results to the control apparatus. The control apparatus may periodically send the query request to the traffic collection apparatus. A periodicity may be fixed, or may be dynamically adjusted based on a status of monitoring data received by the control apparatus last time. This is not limited in this embodiment of this application.

In this embodiment of this application, the target performance indicator includes any one of the following indicators: a latency, a packet length, a packet receiving time interval, or queue usage.

In this embodiment of this application, the traffic collection apparatus is included in a processing chip, for example, may be integrated into an NP chip.

According to a third aspect, an embodiment of this application further provides a traffic collection apparatus. The apparatus may include a first receiving unit, a first determining unit, and a first updating unit. The first receiving unit is configured to receive a first packet. The first determining unit is configured to determine that a measurement value of a target performance indicator of the first packet matches a value of first information in a first register, where the first register further includes second information and third information, the first information in the first register indicates a depth of a data bucket carrying a measurement value of the target performance indicator of a monitored packet, the second information in the first register indicates an accumulated sum of the measurement value that is of the target performance indicator of the monitored packet and that matches the value of the first information in the first register, and the third information in the first register indicates a quantity of packets, in one or more packets received by the traffic collection apparatus, whose measurement values of the target performance indicator match the value of the first information in the first register. The first updating unit is configured to: update a value of the second information in the first register based on the measurement value of the target performance indicator of the first packet, and increase a value of the third information in the first register by 1.

In an embodiment, the first determining unit is specifically configured to determine that the measurement value of the target performance indicator of the first packet falls within a value range corresponding to the value of the first information in the first register. Alternatively, the first determining unit is specifically configured to determine that a difference between the measurement value of the target performance indicator of the first packet and the value of the first information in the first register is less than a difference between the measurement value of the target performance indicator of the first packet and a value of the first information in another register.

In an embodiment, the first updating unit is specifically configured to: add the measurement value of the target performance indicator of the first packet and the value not updated of the second information in the first register, to obtain an updated value of the second information; and replace the value not updated of the second information in the first register with the updated value of the second information.

In an embodiment, the apparatus may further include a first sending unit. The first sending unit is configured to send a monitoring result to a control apparatus, where the monitoring result includes the value of the second information in the first register and the value of the third information in the first register; or the monitoring result includes a value that is of fourth information and that corresponds to the first register and the value of the third information in the first register, the fourth information indicates an average carrying the measurement value of the target performance indicator of the monitored packet, and the value of the fourth information is calculated by the traffic collection apparatus based on the value of the second information and the value of the third information in the first register.

In an embodiment, the first sending unit is specifically configured to send the monitoring result to the control apparatus periodically.

In another embodiment, the first sending unit is specifically configured to send the monitoring result to the control apparatus when it is determined that the value of the third information in the first register is greater than a first threshold. The first threshold may be a preset threshold, or may be a preset proportion of a sum of values of the third information in all registers of the traffic collection apparatus.

In still another embodiment, the first sending unit is specifically configured to send the monitoring result to the control apparatus when it is determined that a sum of values of the third information in all registers of the traffic collection apparatus is greater than a second threshold.

In an embodiment, the apparatus may further include a second receiving unit. The second receiving unit is configured to: before the monitoring result is sent to the control apparatus, receive a query request sent by the control apparatus, where the query request indicates the traffic collection apparatus to send the monitoring result to the control apparatus.

In an embodiment, the apparatus may further include a clearing unit. The clearing unit is configured to clear the value of the second information and the value of the third information in the first register.

The monitoring result is used by the control apparatus to calculate an updated value that is of the first information and that corresponds to each register in the traffic collection apparatus.

In an embodiment, the apparatus may further include a third receiving unit and a second updating unit. The second receiving unit is configured to receive a value sent by the control apparatus that is of the first information and that corresponds to the first register. The second updating unit is configured to update the value of the first information in the first register based on the received value that is of the first information and that corresponds to the first register.

In an embodiment, the apparatus may further include a fourth receiving unit, a second determining unit, and a third updating unit. The fourth receiving unit is configured to receive a second packet. The second determining unit is configured to determine whether the traffic collection apparatus includes a second register, where the second register includes the first information, the second information, and the third information, and values of the second information and the third information in the second register are both 0. The third updating unit is configured to: in response to a case in which it is determined that the traffic collection apparatus includes the second register, update a value of the first information in the second register to a measurement value of the target performance indicator of the second packet, update the value of the second information in the second register to the measurement value of the target performance indicator of the second packet, and increase the value of the third information in the second register by 1.

In this embodiment of this application, the target performance indicator includes any one of the following indicators: a latency, a packet length, a packet receiving time interval, or queue usage.

In this embodiment of this application, the traffic collection apparatus is included in a processing chip, for example, may be integrated into an NP chip.

It should be noted that the traffic collection apparatus provided in the third aspect corresponds to the method provided in the first aspect. For a specific implementation and an effect achieved, refer to the related descriptions of the method described in the first aspect.

According to a fourth aspect, an embodiment of this application further provides a control apparatus. The control apparatus may include a receiving unit, a first determining unit, and a first sending unit. The receiving unit is configured to receive a plurality of monitoring results sent by a traffic collection apparatus, where each of the plurality of monitoring results is determined by the traffic collection apparatus based on a value of second information and a value of third information in a register included in the traffic collection apparatus. The register further includes first information. The first information indicates a depth of a data bucket carrying a measurement value of a target performance indicator of a monitored packet, the second information indicates an accumulated sum of the measurement value that is of the target performance indicator of the monitored packet and that matches a value of the first information in the register, and the third information indicates a quantity of packets, in one or more packets received by the traffic collection apparatus, whose measurement values of the target performance indicator match the value of the first information in the register. The first determining unit is configured to determine a plurality of values of the first information based on the plurality of monitoring results, where the plurality of values of the first information correspond one-to-one to a plurality of registers in the traffic collection apparatus. The first sending unit is configured to send the plurality of values of the first information to the traffic collection apparatus, where the plurality of values of the first information are for updating values of the first information in the plurality of registers in the traffic collection apparatus.

In an embodiment, the receiving unit is specifically configured to receive a first monitoring result corresponding to a first register that is sent by the traffic collection apparatus, where the first monitoring result includes a value that is of fourth information and that corresponds to the first register and a value of the third information, the value of the fourth information is calculated by the traffic collection apparatus based on a value of the second information in the first register and the value of the third information in the first register, and the fourth information indicates an average carrying a measurement value of the target performance indicator of a monitored packet. Alternatively, the first monitoring result includes a value of the second information in the first register and a value of the third information in the first register. In this case, the apparatus may further include a calculation unit. The calculation unit is configured to: before the plurality of values of the first information are determined based on the plurality of monitoring results, calculate, based on the value of the second information and the value of the third information in the first register, a value that is of fourth information and that corresponds to the first register, where the fourth information indicates an average carrying a measurement value of the target performance indicator of a monitored packet.

In this implementation, the first determining unit is specifically configured to determine, based on the value that is of the fourth information and that corresponds to the first register and the value of the third information in the first register, the plurality of values of the first information that correspond to the registers in the traffic collection apparatus.

In an embodiment, the first determining unit is specifically configured to: obtain N pieces of updated monitoring data based on N monitoring results and historical monitoring data, where N is a positive integer, and is a quantity of registers included in the traffic collection apparatus; determine an $i^{th}$ piece of updated monitoring data corresponding to an $i^{th}$ register in the N pieces of updated monitoring data, where i is an integer greater than or equal to 1 and less than or equal to N; and denote a value of the first information and in the $i^{th}$ piece of updated monitoring data as a value that is of the first information and that corresponds to the $i^{th}$ register.

In an embodiment, the apparatus may further include an updating unit. The updating unit is configured to update the historical monitoring data based on the plurality of monitoring results and the historical monitoring data.

In an embodiment, the apparatus may further include a second determining unit. The second determining unit is configured to determine probability distribution of the target performance indicator based on currently stored monitoring data.

In an embodiment, the apparatus may further include a second sending unit. The second sending unit is configured to send a query request to the traffic collection apparatus before the plurality of monitoring results sent by the traffic collection apparatus are received, where the query request indicates the traffic collection apparatus to send the monitoring results to the control apparatus. In an example, the second sending unit is specifically configured to send the query request to the traffic collection apparatus periodically.

In this embodiment of this application, the target performance indicator includes any one of the following indicators: a latency, a packet length, a packet receiving time interval, or queue usage.

In this embodiment of this application, the traffic collection apparatus is included in a processing chip, for example, may be integrated into an NP chip.

It should be noted that the control apparatus provided in the fourth aspect corresponds to the method provided in the second aspect. For a specific implementation and an effect achieved, refer to the related descriptions of the method described in the second aspect.

According to a fifth aspect, an embodiment of this application further provides a traffic collection apparatus. The apparatus includes a processor and a transceiver. The transceiver is configured to receive a first packet. The processor is configured to determine that a measurement value of a target performance indicator of the first packet matches a value of first information in a first register, where the first register further includes second information and third information, the first information in the first register indicates a depth of a data bucket carrying a measurement value of the target performance indicator of a monitored packet, the second information in the first register indicates an accumulated sum of the measurement value that is of the target performance indicator of the monitored packet and that matches the value of the first information in the first register, and the third information in the first register indicates a quantity of packets, in one or more packets received by the traffic collection apparatus, whose measurement values of the target performance indicator match the value of the first information in the first register. The processor is further configured to: update a value of the second information in the first register based on the measurement value of the target performance indicator of the first packet, and increase a value of the third information in the first register by 1.

In an embodiment, the processor is specifically configured to determine that the measurement value of the target performance indicator of the first packet falls within a value range corresponding to the value of the first information in the first register.

In an embodiment, the processor is specifically configured to determine that a difference between the measurement value of the target performance indicator of the first packet and the value of the first information in the first register is less than a difference between the measurement value of the target performance indicator of the first packet and a value of the first information in another register.

In an embodiment, the processor is specifically configured to: add the measurement value of the target performance indicator of the first packet and the value not updated of the second information in the first register, to obtain an updated value of the second information; and replace the value not updated of the second information in the first register with the updated value of the second information.

In an embodiment, the transceiver is further configured to send a monitoring result to a control apparatus, where the monitoring result includes the value of the second information in the first register and the value of the third information in the first register.

In an embodiment, the transceiver is further configured to send a monitoring result to a control apparatus, where the monitoring result includes a value that is of fourth information and that corresponds to the first register and the value of the third information in the first register, the fourth information indicates an average carrying the measurement value of the target performance indicator of the monitored packet, and the value of the fourth information is calculated by the traffic collection apparatus based on the value of the second information and the value of the third information in the first register.

In an embodiment, the transceiver is specifically configured to periodically send the monitoring result to the control apparatus.

In an embodiment, the transceiver is specifically configured to send the monitoring result to the control apparatus when it is determined that the value of the third information in the first register is greater than a first threshold. The first threshold may be a preset threshold, or may be a preset proportion of a sum of values of the third information in all registers of the traffic collection apparatus.

In an embodiment, the transceiver is specifically configured to send the monitoring result to the control apparatus when it is determined that a sum of values of the third information in all registers of the traffic collection apparatus is greater than a second threshold.

In an embodiment, the transceiver is further configured to: before the monitoring result is sent to the control apparatus, receive a query request sent by the control apparatus, where the query request indicates the traffic collection apparatus to send the monitoring result to the control apparatus.

In an embodiment, the processor is further configured to clear the value of the second information and the value of the third information in the first register.

In an embodiment, the monitoring result is used by the control apparatus to calculate an updated value that is of the first information and that corresponds to each register in the traffic collection apparatus.

In an embodiment, the transceiver is further configured to receive a value sent by the control apparatus that is of the first information and that corresponds to the first register. The processor is further configured to update the value of the first information in the first register based on the received value that is of the first information and that corresponds to the first register.

In an embodiment, the transceiver is further configured to receive a second packet. The processor is further configured to determine whether the traffic collection apparatus includes a second register, where the second register includes the first information, the second information, and the third information, and values of the second information and the third information in the second register are both 0. The processor is further configured to: in response to a case in which it is determined that the traffic collection apparatus includes the second register, update a value of the first information in the second register to a measurement value of the target performance indicator of the second packet, update the value of the second information in the second register to the measurement value of the target performance indicator of the second packet, and increase the value of the third information in the second register by 1.

In this embodiment of this application, the target performance indicator includes any one of the following indicators: a latency, a packet length, a packet receiving time interval, or queue usage.

In this embodiment of this application, the traffic collection apparatus is included in a processing chip, for example, may be integrated into an NP chip.

It should be noted that the traffic collection apparatus provided in the fifth aspect corresponds to the method provided in the first aspect. For a specific implementation and an effect achieved, refer to the related descriptions of the method described in the first aspect.

According to a sixth aspect, an embodiment of this application further provides a control apparatus. The apparatus includes a transceiver and a processor. The transceiver is configured to receive a plurality of monitoring results sent by a traffic collection apparatus, where each of the plurality of monitoring results is determined by the traffic collection apparatus based on a value of second information and a value of third information in a register included in the traffic collection apparatus. The register further includes first information. The first information indicates a depth of a data bucket carrying a measurement value of a target performance indicator of a monitored packet, the second information indicates an accumulated sum of the measurement value that is of the target performance indicator of the monitored packet and that matches a value of the first information in the register, and the third information indicates a quantity of packets, in one or more packets received by the traffic collection apparatus, whose measurement values of the target performance indicator match the value of the first information in the register. The processor is configured to determine a plurality of values of the first information based on the plurality of monitoring results, where the plurality of values of the first information correspond one-to-one to a plurality of registers in the traffic collection apparatus. The transceiver is further configured to send the plurality of values of the first information to the traffic collection apparatus, where the plurality of values of the first information are for updating values of the first information in the plurality of registers in the traffic collection apparatus.

In an embodiment, the transceiver is specifically configured to receive a first monitoring result corresponding to a first register that is sent by the traffic collection apparatus, where the first monitoring result includes a value that is of fourth information and that corresponds to the first register and a value of the third information, the value of the fourth information is calculated by the traffic collection apparatus based on a value of the second information in the first register and the value of the third information in the first register, and the fourth information indicates an average carrying a measurement value of the target performance indicator of a monitored packet.

In an embodiment, the transceiver is specifically configured to receive a first monitoring result corresponding to a first register that is sent by the traffic collection apparatus, where the first monitoring result includes a value of the second information in the first register and a value of the third information in the first register.

In an embodiment, the processor is further configured to: before the plurality of values of the first information are determined based on the plurality of monitoring results, calculate, based on the value of the second information and the value of the third information in the first register, a value that is of fourth information and that corresponds to the first register, where the fourth information indicates an average carrying a measurement value of the target performance indicator of a monitored packet. The processor is specifically configured to determine, based on the value that is of the fourth information and that corresponds to the first register and the value of the third information in the first register, the plurality of values of the first information that correspond to the registers in the traffic collection apparatus.

In an embodiment, the processor is specifically configured to: obtain N pieces of updated monitoring data based on N monitoring results and historical monitoring data, where N is a positive integer, and is a quantity of registers included in the traffic collection apparatus; determine an $i^{th}$ piece of updated monitoring data corresponding to an $i^{th}$ register in the N pieces of updated monitoring data, where i is an integer greater than or equal to 1 and less than or equal to N; and denote a value of the first information and in the $i^{th}$ piece of updated monitoring data as a value that is of the first information and that corresponds to the $i^{th}$ register.

In an embodiment, the processor is further configured to update the historical monitoring data based on the plurality of monitoring results and the historical monitoring data.

In an embodiment, the processor is further configured to determine probability distribution of the target performance indicator based on currently stored monitoring data.

In an embodiment, the transceiver is configured to send a query request to the traffic collection apparatus before the plurality of monitoring results sent by the traffic collection apparatus are received, where the query request indicates the traffic collection apparatus to send the monitoring results to the control apparatus.

In an embodiment, the transceiver is specifically configured to periodically send the query request to the traffic collection apparatus.

In this embodiment of this application, the target performance indicator includes any one of the following indicators: a latency, a packet length, a packet receiving time interval, or queue usage.

In this embodiment of this application, the traffic collection apparatus is included in a processing chip, for example, may be integrated into an NP chip.

It should be noted that the control apparatus provided in the sixth aspect corresponds to the method provided in the second aspect. For a specific implementation and an effect achieved, refer to the related descriptions of the method described in the second aspect.

According to a seventh aspect, an embodiment of this application further provides a traffic collection apparatus. The apparatus includes a processor and a memory. The memory is configured to store a program, and the processor is configured to invoke the program from the memory and run the program to perform the method according to any possible implementation of the first aspect.

According to an eighth aspect, an embodiment of this application further provides a control apparatus. The apparatus includes a processor and a memory. The memory is configured to store a program, and the processor is configured to invoke the program from the memory and run the program to perform the method according to any possible implementation of the second aspect.

According to a ninth aspect, an embodiment of this application further provides an integrated circuit. The integrated circuit includes a control circuit and an interface circuit. The interface circuit is configured to receive a first packet. The control circuit is configured to determine that a measurement value of a target performance indicator of the first packet matches a value of first information in a first register, where the first register further includes second information and third information, the first information in the first register indicates a depth of a data bucket carrying a measurement value of the target performance indicator of a monitored packet, the second information in the first register indicates an accumulated sum of the measurement value that is of the target performance indicator of the monitored packet and that matches the value of the first information in the first register, and the third information in the first register indicates a quantity of packets, in one or more packets received by the integrated circuit, whose measurement values of the target performance indicator match the value of the first information in the first register. The control circuit is further configured to: update a value of the second information in the first register based on the measurement value of the target performance indicator of the first packet, and increase a value of the third information in the first register by 1.

In an embodiment, the control circuit is specifically configured to determine that the measurement value of the target performance indicator of the first packet falls within a value range corresponding to the value of the first information in the first register.

In an embodiment, the control circuit is specifically configured to determine that a difference between the measurement value of the target performance indicator of the first packet and the value of the first information in the first register is less than a difference between the measurement value of the target performance indicator of the first packet and a value of the first information in another register.

In an embodiment, the control circuit is specifically configured to: add the measurement value of the target performance indicator of the first packet and the value not updated of the second information in the first register, to obtain an updated value of the second information; and replace the value not updated of the second information in the first register with the updated value of the second information.

In an embodiment, the interface circuit is further configured to send a monitoring result to a control apparatus, where the monitoring result includes the value of the second information in the first register and the value of the third information in the first register.

In an embodiment, the interface circuit is further configured to send a monitoring result to a control apparatus, where the monitoring result includes a value that is of fourth information and that corresponds to the first register and the value of the third information in the first register, the fourth information indicates an average carrying the measurement value of the target performance indicator of the monitored packet, and the value of the fourth information is calculated by the traffic collection apparatus based on the value of the second information and the value of the third information in the first register.

In an embodiment, the interface circuit is specifically configured to periodically send the monitoring result to the control apparatus.

In an embodiment, the interface circuit is specifically configured to send the monitoring result to the control apparatus when it is determined that the value of the third information in the first register is greater than a first threshold. The first threshold may be a preset threshold, or may be a preset proportion of a sum of values of the third information in all registers of the integrated circuit.

In an embodiment, the interface circuit is specifically configured to send the monitoring result to the control apparatus when it is determined that a sum of values of the third information in all registers of the integrated circuit is greater than a second threshold.

In an embodiment, the interface circuit is further configured to: before the monitoring result is sent to the control apparatus, receive a query request sent by the control apparatus, where the query request indicates the integrated circuit to send the monitoring result to the control apparatus.

In an embodiment, the control circuit is further configured to clear the value of the second information and the value of the third information in the first register.

In an embodiment, the monitoring result is used by the control apparatus to calculate an updated value that is of the first information and that corresponds to each register in the integrated circuit.

In an embodiment, the interface circuit is further configured to receive a value sent by the control apparatus that is of the first information and that corresponds to the first register. The control circuit is further configured to update the value of the first information in the first register based on the received value that is of the first information and that corresponds to the first register.

In an embodiment, the interface circuit is further configured to receive a second packet. The control circuit is further configured to determine whether the integrated circuit includes a second register, where the second register includes the first information, the second information, and the third information, and values of the second information and the third information in the second register are both 0. The control circuit is further configured to: in response to a case in which it is determined that the integrated circuit includes the second register, update a value of the first information in the second register to a measurement value of the target performance indicator of the second packet, update the value of the second information in the second register to the measurement value of the target performance indicator of the second packet, and increase the value of the third information in the second register by 1.

In this embodiment of this application, the target performance indicator includes any one of the following indicators: a latency, a packet length, a packet receiving time interval, or queue usage.

In this embodiment of this application, the integrated circuit is included in a processing chip, for example, may be integrated into an NP chip.

It should be noted that the integrated circuit provided in the ninth aspect corresponds to the method provided in the first aspect. For a specific implementation and an effect achieved, refer to the related descriptions of the method described in the first aspect.

According to a tenth aspect, an embodiment of this application further provides an integrated circuit. The integrated circuit includes an interface circuit and a control circuit. The interface circuit is configured to receive a plurality of monitoring results sent by a traffic collection apparatus, where each of the plurality of monitoring results is determined by the traffic collection apparatus based on a value of second information and a value of third information in a register included in the traffic collection apparatus. The register further includes first information. The first information indicates a depth of a data bucket carrying a measurement value of a target performance indicator of a monitored packet, the second information indicates an accumulated sum of the measurement value that is of the target performance indicator of the monitored packet and that matches a value of the first information in the register, and the third information indicates a quantity of packets, in one or more packets received by the traffic collection apparatus, whose measurement values of the target performance indicator match the value of the first information in the register. The control circuit is configured to determine a plurality of values of the first information based on the plurality of monitoring results, where the plurality of values of the first information correspond one-to-one to a plurality of registers in the traffic collection apparatus. The interface circuit is further configured to send the plurality of values of the first information to the traffic collection apparatus, where the plurality of values of the first information are for updating values of the first information in the plurality of registers in the traffic collection apparatus.

In an embodiment, the interface circuit is specifically configured to receive a first monitoring result corresponding to a first register that is sent by the traffic collection apparatus, where the first monitoring result includes a value that is of fourth information and that corresponds to the first register and a value of the third information, the value of the fourth information is calculated by the traffic collection apparatus based on a value of the second information in the first register and the value of the third information in the first register, and the fourth information indicates an average carrying a measurement value of the target performance indicator of a monitored packet.

In an embodiment, the interface circuit is specifically configured to receive a first monitoring result corresponding to the first register that is sent by the traffic collection apparatus, where the first monitoring result includes a value of the second information in the first register and a value of the third information in the first register.

In an embodiment, the control circuit is further configured to: before the plurality of values of the first information are determined based on the plurality of monitoring results, calculate, based on the value of the second information and the value of the third information in the first register, a value that is of fourth information and that corresponds to the first register, where the fourth information indicates an average carrying a measurement value of the target performance indicator of a monitored packet. In this case, the control circuit is specifically configured to determine, based on the value that is of the fourth information and that corresponds to the first register and the value of the third information in the first register, the plurality of values of the first information that correspond to the registers in the traffic collection apparatus.

In an embodiment, the control circuit is specifically configured to: obtain N pieces of updated monitoring data based on N monitoring results and historical monitoring data, where N is a positive integer, and is a quantity of registers included in the traffic collection apparatus; determine an $i^{th}$ piece of updated monitoring data corresponding to an $i^{th}$ register in the N pieces of updated monitoring data, where i is an integer greater than or equal to 1 and less than or equal to N; and denote a value of the first information and in the $i^{th}$ piece of updated monitoring data as a value that is of the first information and that corresponds to the $i^{th}$ register.

In an embodiment, the control circuit is further configured to update the historical monitoring data based on the plurality of monitoring results and the historical monitoring data.

In an embodiment, the control circuit is further configured to determine probability distribution of the target performance indicator based on currently stored monitoring data.

In an embodiment, the interface circuit is configured to send a query request to the traffic collection apparatus before the plurality of monitoring results sent by the traffic collection apparatus are received, where the query request indicates the traffic collection apparatus to send the monitoring results to the integrated circuit.

In an embodiment, the interface circuit is specifically configured to periodically send the query request to the traffic collection apparatus.

In this embodiment of this application, the target performance indicator includes any one of the following indicators: a latency, a packet length, a packet receiving time interval, or queue usage.

In this embodiment of this application, the traffic collection apparatus is included in a processing chip, for example, may be integrated into an NP chip.

It should be noted that the integrated circuit provided in the tenth aspect corresponds to the method provided in the second aspect. For a specific implementation and an effect achieved, refer to the related descriptions of the method described in the second aspect.

According to an eleventh aspect, an embodiment of this application further provides a network device. The network device may include a first apparatus and a second apparatus. The first apparatus includes the traffic collection apparatus provided in the third aspect, the fifth aspect, or the seventh aspect or the integrated circuit provided in the ninth aspect. The second apparatus includes the control apparatus provided in the fourth aspect, the sixth aspect, or the eighth aspect or the integrated circuit provided in the tenth aspect.

According to a twelfth aspect, an embodiment of this application further provides a network system. The network system includes a first network device and a second network device. The first network device includes the traffic collection apparatus provided in the third aspect, the fifth aspect, or the seventh aspect or the integrated circuit provided in the ninth aspect. The second network device includes the control apparatus provided in the fourth aspect, the sixth aspect, or the eighth aspect or the integrated circuit provided in the tenth aspect.

According to a thirteenth aspect, an embodiment of this application further provides a computer-readable storage medium, including instructions. When the instructions are run on a computer, the computer is enabled to perform the method provided in the first aspect or the second aspect.

According to a fourteenth aspect, this application further provides a computer program product, including a computer program or computer-readable instructions. When the computer program or the computer-readable instructions is/are run on a computer, the computer is enabled to perform the method provided in the first aspect or the second aspect.

DESCRIPTION OF EMBODIMENTS

To reduce storage resources for obtaining distribution information of various performance indicators such as a storage latency, a packet length, a packet receiving time interval, or queue usage, statuses of the performance indicators are usually recorded through histogram statistics, to reflect a running status of a network.

Currently, in an example, statistics on a performance indicator of a network device may be collected by using four registers R1 to R4 on the network device. For example, the performance indicator on which the statistics are collected is a latency. It is assumed that a preset target quantile value (namely, a reference proportion for adjusting a latency threshold) is 95%; R1 is configured to store a total quantity n of packets collected in a current periodicity, where each time the network device receives one packet, a value in R1 is increased by 1; R2 is configured to store a latency threshold t1 in the periodicity; R3 is configured to store a quantity m of packets, in the packets received in the periodicity, whose latencies exceed the latency threshold t1; and R4 is configured to store a maximum latency (ML) in the packets currently received in the periodicity. During specific implementation, the network device periodically calculates m/n (namely, a proportion of the packets whose latencies are greater than t1 in all the packets), and updates a value in R2 based on m/n and the target quantile value. When (1−m/n) <95%, a new latency threshold t2 is calculated according to the following formula (1); or when (1−m/n)>95%, a new latency threshold t3 is calculated according to the following formula (2):

$$t2=t1-ML*[95\%-(1-m/n)]/G \quad \text{formula (1)}$$

$$t3=t1+ML*[(1-m/n)-95\%]/G \quad \text{formula (2)}$$

G is a step, and is a constant. It should be noted that each time the value in R2 is updated, values in the other registers need to be cleared. This statistical solution is easy to implement, but has many problems: Problem 1: The statistics on the performance indicator of the network device are collected by using only a simple gradient descent method, and impact of historical data on the performance indicator of the network device is not considered, causing low statistical precision. Problem 2: A statistical result usually reflects only a status that the performance indicator is in when the target quantile value is the corresponding value in the current periodicity, information about the performance indicator when the target quantile value is another value cannot be obtained, and a status of the performance indicator in an entire running process of the network device cannot be obtained either. Consequently, the statistical significance is greatly reduced.

Figure 1:
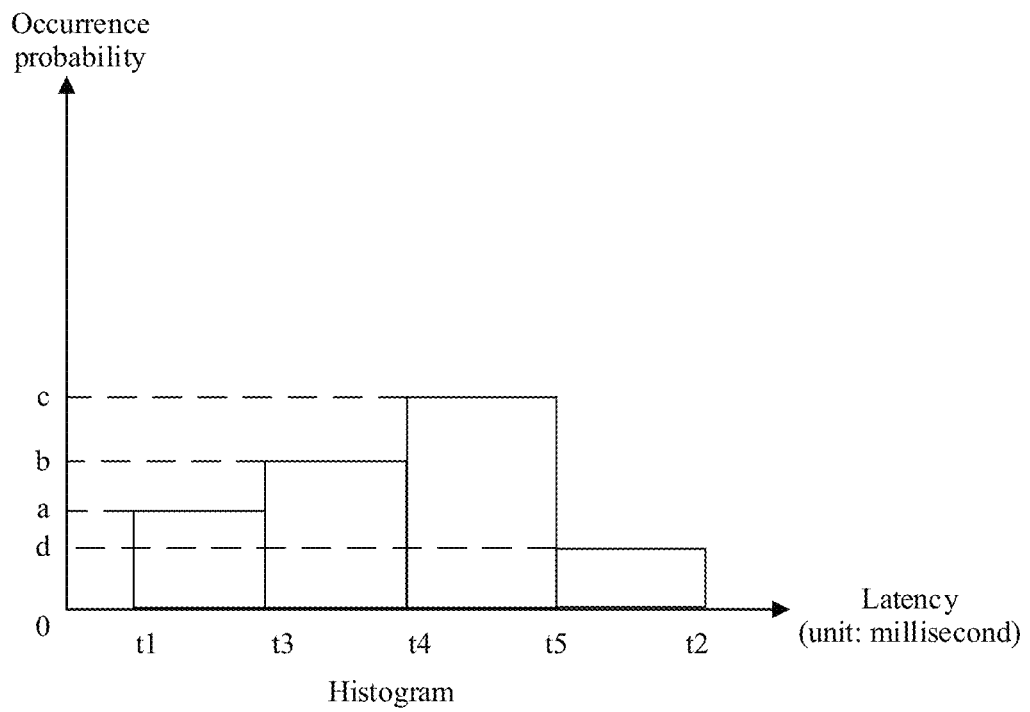
FIG. 1 is a schematic diagram of a histogram of a latency in a histogram statistics algorithm according to an embodiment of this application.

In another example, currently, statistics on a performance indicator may alternatively be collected by using a histogram statistics algorithm. The statistics on the performance indicator are collected by using R1 to R4. For example, each of R1 to R4 includes one data bucket for latency statistics collection. This example is described by using a specific implementation of the data bucket, namely, a bin, in a histogram statistics method as an example. For example, R1 includes a bin 1 for the latency statistics collection, R2 includes a bin 2 for the latency statistics collection, R3 includes a bin 3 for the latency statistics collection, and R4 includes a bin 4 for the latency statistics collection. In this case, the bin 1 to the bin 4 are a group of bins for the latency statistics collection. A network device pre-configures a latency statistics range: [t1, t2]. The bin 1 to the bin 4 each include a counter, and each counter is for counting a quantity of packets, in received packets, that fall within a latency sub-range corresponding to the bin to which the counter belongs. For example, [t1, t2] is equally divided into four subintervals: [t1, t3], (t3, t4], (t4, t5], and (t5, t2], where t3=t1+(t2−t1)/4, t4=t3+(t2−t1)/4, and t5=t4+(t2−t1)/4. A counter 1 in the bin 1 is for counting a quantity of packets whose latencies fall within [t1, t3] in the received packets, a counter 2 in the bin 2 is for counting a quantity of packets whose latencies fall within (t3, t4] in the received packets, a counter 3 in the bin 3 is for counting a quantity of packets whose latencies fall within (t4, t5] in the received packets, and a counter 4 in the bin 4 is for counting a quantity of packets whose latencies fall within (t5, t2] in the received packets. Any latency sub-range may be denoted as a depth of the bin. For example, the latency sub-range (t3, t4] may be referred to as a depth of the bin 2. A probability distribution curve of a latency of the network device may be obtained at any moment based on values of the counters in the bin 1 to the bin 4. For example, a process may be: The values of the counters are normalized to obtain normalizing results of the counter 1 to the counter 4, namely, a, b, c, and d in sequence. In this case, a histogram shown in FIG. 1 may be obtained, where histogram heights corresponding to the bin 1 to the bin 4 are respectively a, b, c, and d. In addition, a cumulative distribution function (CDF) curve of the latency may be obtained based on the histogram, and a corresponding value of a horizontal coordinate may be further determined based on a required occurrence probability (for example, 95%), and is used as a latency calibration value that is set by the network device. Compared with the foregoing statistical method, the current histogram statistics algorithm can be for accurately collecting the statistics on the performance indicator of the network device. However, in this histogram statistics solution, the value range corresponding to the performance indicator needs to be preconfigured and equally divided into the corresponding bins. A configuration process is complex. Due to diversity and complexity of packets, the configured value range and division into the depths of the bins may be inappropriate. A value of a counter in a part of bins is large, and a value of a counter in another part of bins is small, causing an inaccurate statistical result.

Based on this, embodiments of this application provide a traffic monitoring method. The traffic monitoring method is applied to a traffic collection apparatus provided in embodiments of this application. The traffic collection apparatus includes a plurality of registers, and each register includes first information, second information, and third information. The first information indicates a depth of a data bucket carrying a measurement value of a target performance indicator of a monitored packet, the second information indicates an accumulated sum of the measurement value that is of the target performance indicator of the monitored packet and that matches a value of the first information in the register, and the third information indicates a quantity of packets, in one or more packets received by the traffic collection apparatus, whose measurement values of the target performance indicator match the value of the first information in the register. Each register corresponds to one data bucket. The data bucket collects statistics on a packet whose measurement value of the target performance indicator falls within a specific range. A value of the first information, a value of the second information, and a value of the third information are recorded in the data bucket. The value of the first information refers to the measurement value or a range of the measurement value of the packet on which the statistics are collected in the data bucket, the value of the second information refers to an accumulated sum of measurement values of all packets on which statistics are collected in the data bucket, and the value of the third information refers to a quantity of packets on which the statistics are collected in the data bucket. A statistical result recorded in the data bucket is stored in the corresponding register. A depth of a data bucket corresponding to a register may be used as a value of the first information in the register, a sum of a measurement value of the target performance indicator of a packet that falls within a corresponding range of the depth of the corresponding data bucket may be used as a value of the second information in the register corresponding to the data bucket, and a quantity of packets falling within a corresponding range of the depth of the corresponding data bucket may be used as a value of the third information in the register corresponding to the data bucket. For example, a register Rx corresponds to a data bucket x, and a depth of the data bucket x may be represented as 25 (in other words, a value of the first information in the register Rx is 25), and is for collecting statistics on a packet whose measurement value of the target performance indicator falls within 25±25. In this case, when the traffic collection apparatus does not receive a packet whose measurement value of the target performance indicator falls within 0 to 50, the value of the first information, a value of the second information, and a value of the third information in the register Rx are 0. When the traffic collection apparatus receives a packet 1 whose measurement value of the target performance indicator is 10, in the register Rx, the value of the first information is 25, the value of the second information is 10, and the value of the third information is 1. When the traffic collection apparatus receives a packet 2 whose measurement value of the target performance indicator is 16, in the register Rx, the value of the first information is 25, the value of the second information is (10+16)=26, and the value of the third information may be 2. When the traffic collection apparatus receives a packet 3 whose measurement value of the target performance indicator is 45, in the register Rx, the value of the first information is 25, the value of the second information is (26+45)=71, and the value of the third information may be 3.

The traffic monitoring method provided in embodiments of this application may include, for example: When receiving a first packet, a traffic collection apparatus determines that a measurement value of a target performance indicator of the first packet matches a value of first information in a first register. In this case, the traffic collection apparatus may update a value of second information in the first register based on the measurement value of the target performance indicator of the first packet, and increase a value of third information in the first register by 1. In this way, a value range of a to-be-monitored performance indicator (namely, the target performance indicator) does not need to be configured, and the value range does not need to be equally divided to determine a depth of each data bucket either. Instead, the first information indicating a depth of a data bucket that carries a measurement value of the target performance indicator of a monitored packet, the second information indicating an accumulated sum of the measurement value that is of the target performance indicator of the monitored packet and that matches a value of the first information in each register, and the third information indicating a quantity of packets, in one or more received packets, whose measurement values of the target performance indicator match the value of the first information in each register are used as three statistical parameters of the register, to match a measurement value of the target performance indicator of the received packet with the value of the first information in each register, and flexibly update values of the two statistical parameters, namely, the second information and the third information, in a matched register, so that statistics on the target performance indicator are collected. This not only reduces configuration workload for collecting the statistics on the target performance indicator, but also makes it possible to obtain a more comprehensive and accurate statistical result because an entire statistical value range and a statistical value sub-range of each register are not limited. It should be noted that, in this implementation, a quantity of registers in the traffic collection apparatus has slight impact on accuracy of the statistical result. Therefore, the statistics on the performance indicator of a network device can be precisely collected without excessive hardware resources.

A data bucket represents an object for collecting statistics on the measurement value of the target performance indicator, a depth of the data bucket refers to a measurement value or a measurement value range that is of the target performance indicator and on which statistics can be collected in the data bucket, and data buckets with different depths are for collecting statistics on packets with different measurement values or different measurement value ranges of the target performance indicator. For example, the traffic collection apparatus includes a data bucket 1 and a data bucket 2. The data bucket 1 is for collecting statistics on a packet whose measurement value of the target performance indicator falls within 0 to 50, and the data bucket 2 is for collecting statistics on a packet whose measurement value of the target performance indicator falls within 51 to 101. In this case, a depth of the data bucket 1 may be represented as 0 to 50, and a depth of the data bucket 2 may be represented as 51 to 100. Alternatively, if the depth of the data bucket is a minimum value of the measurement value that is of the target performance indicator and that is carried in the data bucket, and the data bucket carries a packet whose measurement value falls within the depth of the data bucket to the depth of the data bucket plus 50, the depth of the data bucket 1 may be represented as 0, and a depth of the data bucket 2 may be represented as 51. Alternatively, if the depth of the data bucket is an intermediate value of the measurement value that is of the target performance indicator and that is carried in the data bucket, and the data bucket carries a packet whose measurement value falls within the depth of the data bucket±25, a depth of the data bucket 1 may be represented as 25, and a depth of the data bucket 2 may be represented as 76. Alternatively, the depth of the data bucket may be represented as an average of a measurement value of a packet that falls within a statistical range of the data bucket. For example, if statistics on a packet whose measurement value of the target performance indicator is 10 are collected in the data bucket 1, a depth of the data bucket 1 may be represented as 10. For another example, if statistics on three packets whose measurement values of the target performance indicator are respectively 18, 50, and 22 are collected in the data bucket 1, a depth of the data bucket 1 may be represented as (18+50+22)/3=30.

The register is a hardware implementation of the data bucket in the traffic collection apparatus. For example, data on which statistics are collected in the data bucket 1 may be stored in a register 1 of the traffic collection apparatus, and data on which statistics are collected in the data bucket 2 may be stored in a register 2 of the traffic collection apparatus. It is assumed that the traffic collection apparatus receives a packet 1 to a packet 5, and measurement values of the target performance indicator of the packet 1 to the packet 5 are respectively 10, 20, 60, 30, and 90. In this case, the packet 1, the packet 2, and the packet 4 correspond to the depth of the data bucket 1 (in other words, fall within a statistical range of the data bucket 1), and the register 1 stores statistical results corresponding to the packet 1, the packet 2, and the packet 4; the packet 3 and the packet 5 correspond to the depth of the data bucket 2, and the register 2 stores statistical results corresponding to the packet 3 and the packet 5. For example, in the register 1 corresponding to the data bucket 1, a value of the first information may be 25, a value of the second information may be (10+20+30)=60, and a value of the third information may be 3; in the register 2 corresponding to the data bucket 2, a value of the first information may be 76, a value of the second information may be (60+90)=150, and a value of the third information may be 2.

In an example, in the histogram statistics method, the data bucket may be implemented, for example, by using a bin. Each register stores a statistical result corresponding to one bin, and the statistical result collected by the bin is stored in the corresponding register. In the following descriptions, the data bucket, the bin, and the register may be used interchangeably.

The first information in the register may be represented as value, the second information in the register may be represented as sum, and the third information in the register may be represented as counter. In the following descriptions, the first information and value may be used interchangeably, the second information and sum may be used interchangeably, and the third information and counter may be used interchangeably.

Figure 2:
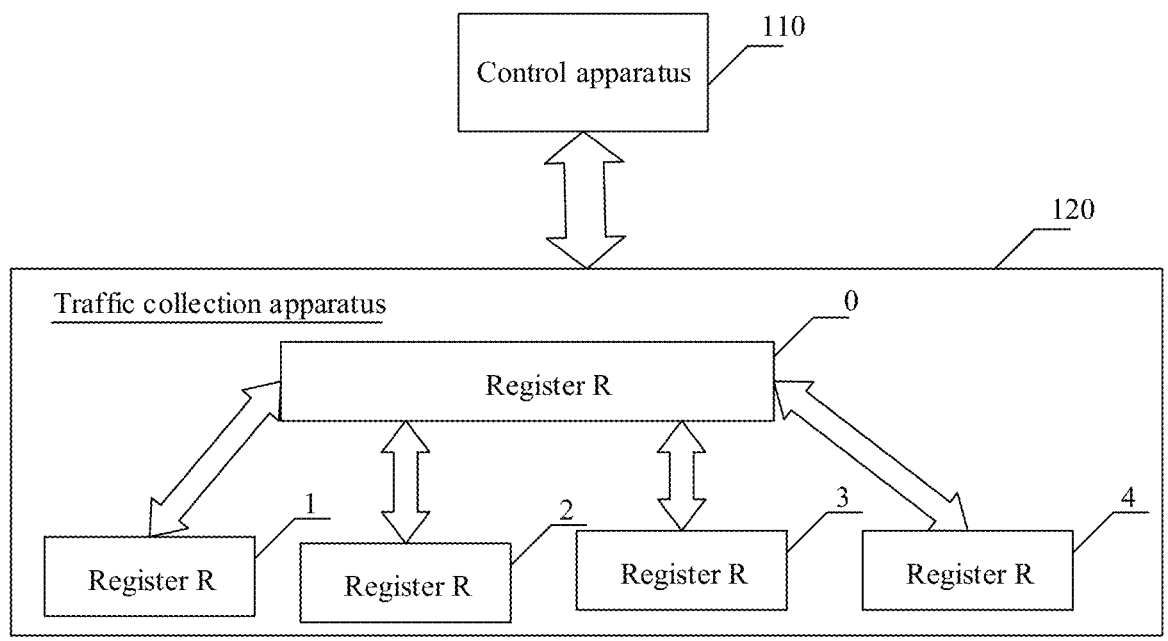
FIG. 2 is a schematic diagram of a structure of an applicable scenario according to an embodiment of this application.

For example, embodiments of this application may be applied to a scenario shown in FIG. 2. As shown in FIG. 2, the scenario may include at least a control apparatus 110 and a traffic collection apparatus 120.

The traffic collection apparatus 120 may include a plurality of registers R. For example, the traffic collection apparatus 120 includes R1 to R4. According to the traffic monitoring method provided in embodiments of this application, the traffic collection apparatus 120 can manage, control, and process content stored in R1 to R4. The traffic collection apparatus 120 may be integrated into a processing chip, for example, may be integrated into a network processor (NP). The traffic collection apparatus 120 may be a functional module that is in an NP chip and that has a traffic collection capability provided in embodiments of this application. For example, the traffic collection apparatus 120 is a coprocessor that has the traffic collection capability in the NP chip.

The control apparatus 110 is configured to learn of and analyze, based on monitoring results stored in R1 to R4, a target performance indicator of a network device in which the traffic collection apparatus 120 is located. For example, the control apparatus 110 may be a central processing unit (CPU) 110. The control apparatus 110 and the traffic collection apparatus 120 may be integrated into the same network device, or may be separately integrated into two network devices that can implement communication.

It should be noted that, in this example, the registers configured to store the monitoring results are R1 to R4, and the traffic collection apparatus 120 may further include a register R0, where R0 is configured to store a measurement value of the target performance indicator of a packet on which statistics are to be collected and a value (namely, 1) of third information. If one packet on which statistics are to be collected is received, a value of first information in R0 is updated based on a measurement value of the target performance indicator of the packet on which the statistics are to be collected. After the statistics on the packet on which the statistics are to be collected are collected, relevant content of the packet in R0 may be cleared to prepare for collecting statistics on a next packet. Alternatively, when a next packet on which statistics are to be collected is received, the value of the first information of the current packet in R0 may be directly updated by using a measurement value of the target performance indicator of the next packet.

Figure 3:
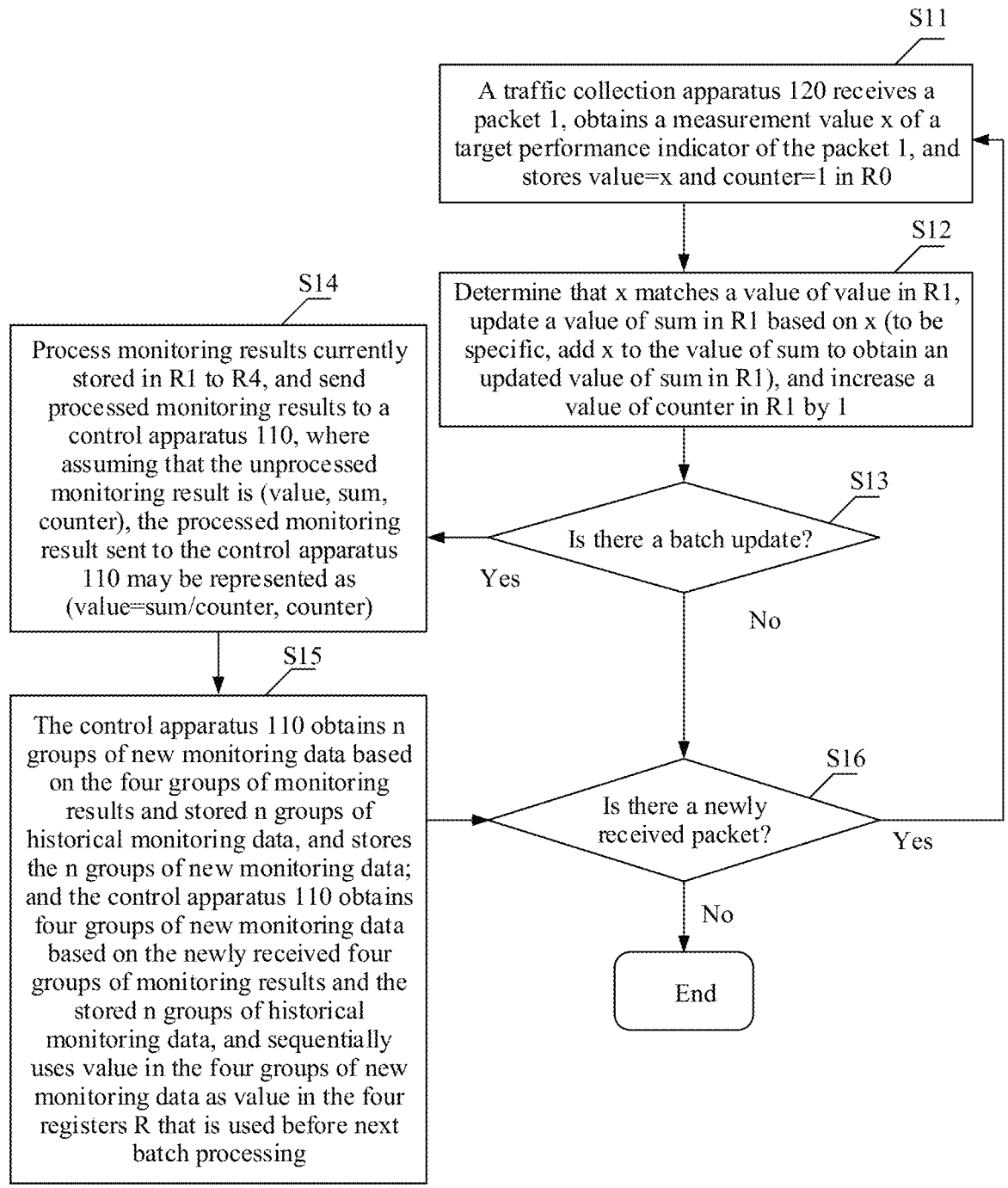
FIG. 3 is a schematic flowchart of an example of a traffic monitoring method according to an embodiment of this application.
Figure 4A:
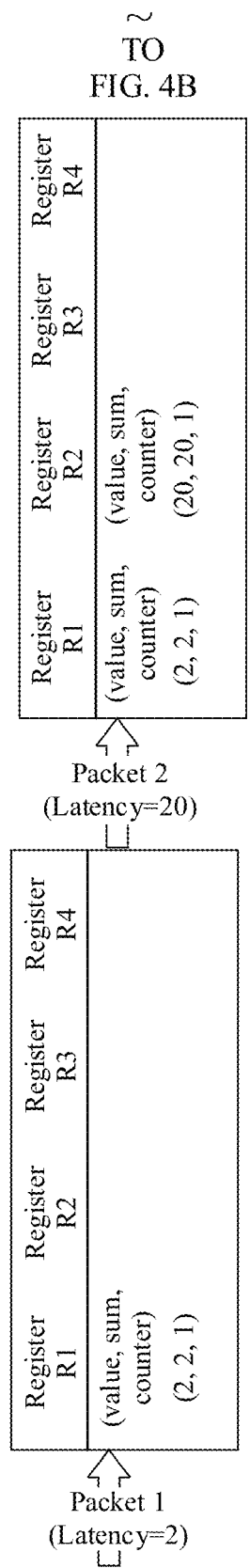
FIG. 4A to FIG. 4D are a schematic diagram of content stored in each register in the traffic monitoring method shown in FIG. 3 according to this embodiment of this application.
Figure 4B:
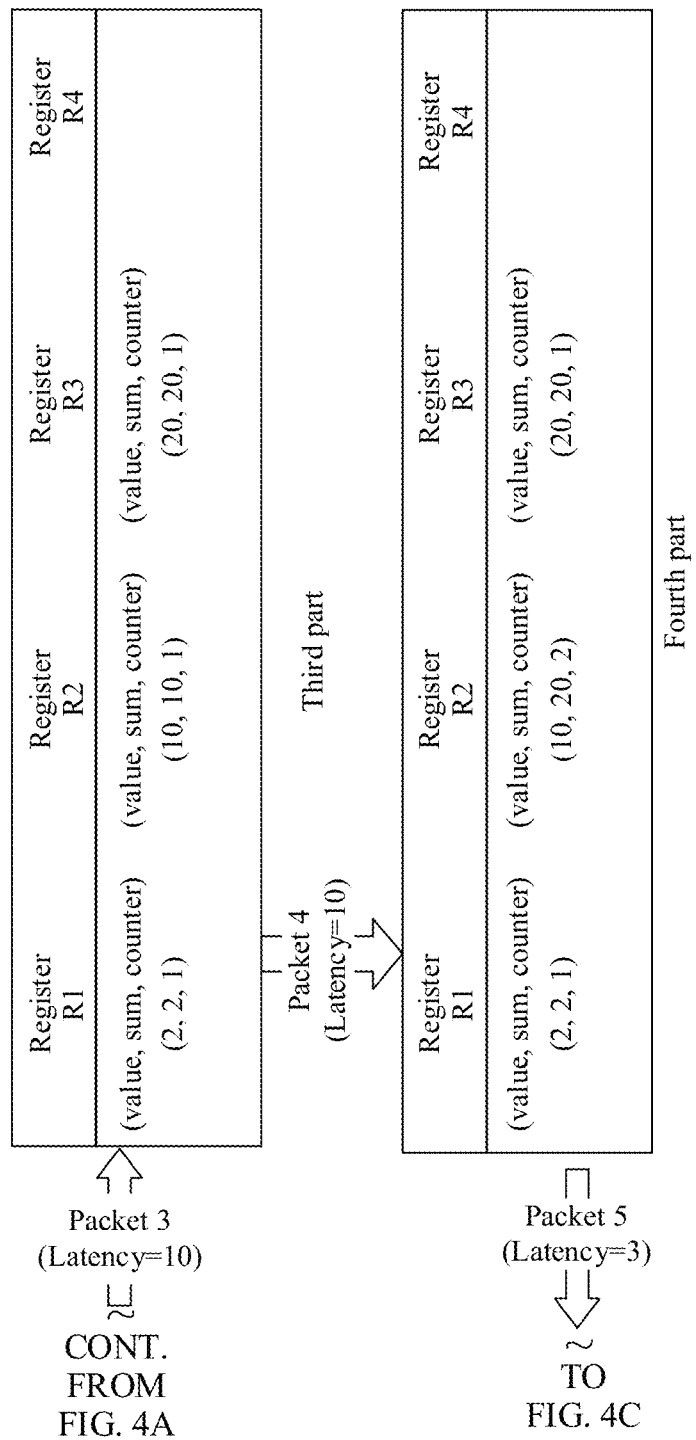
Figure 4C:
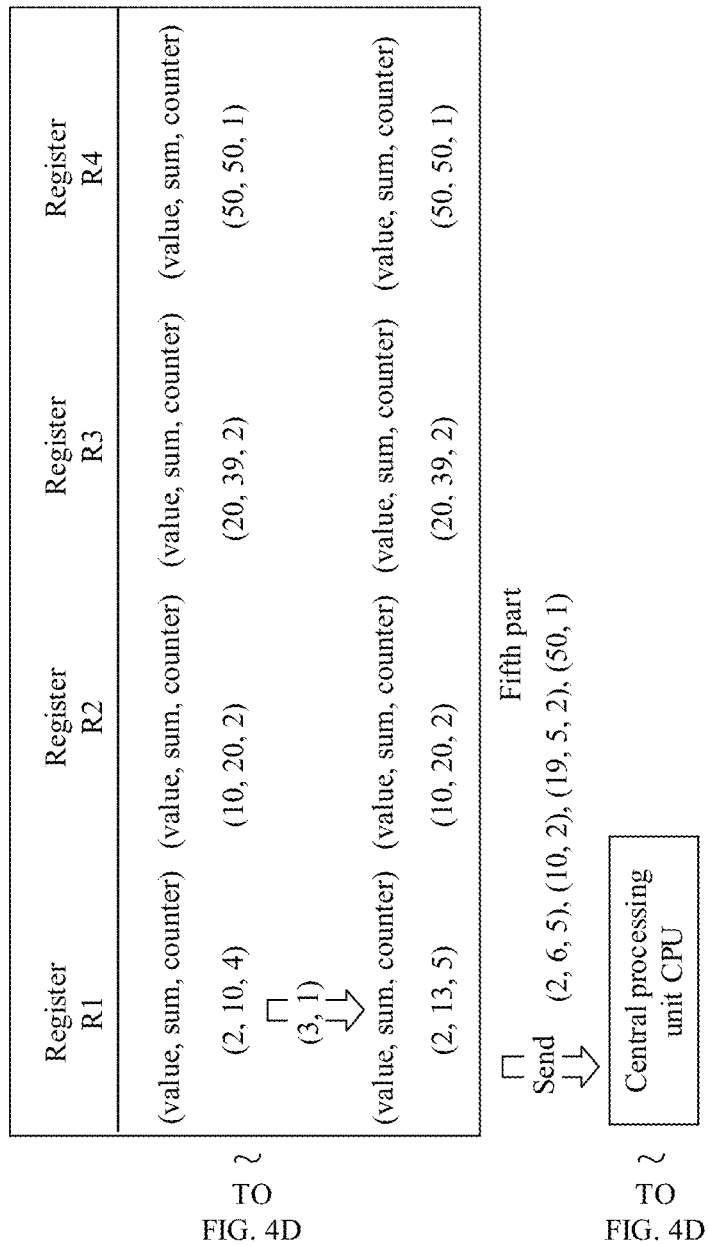
Figure 4D:
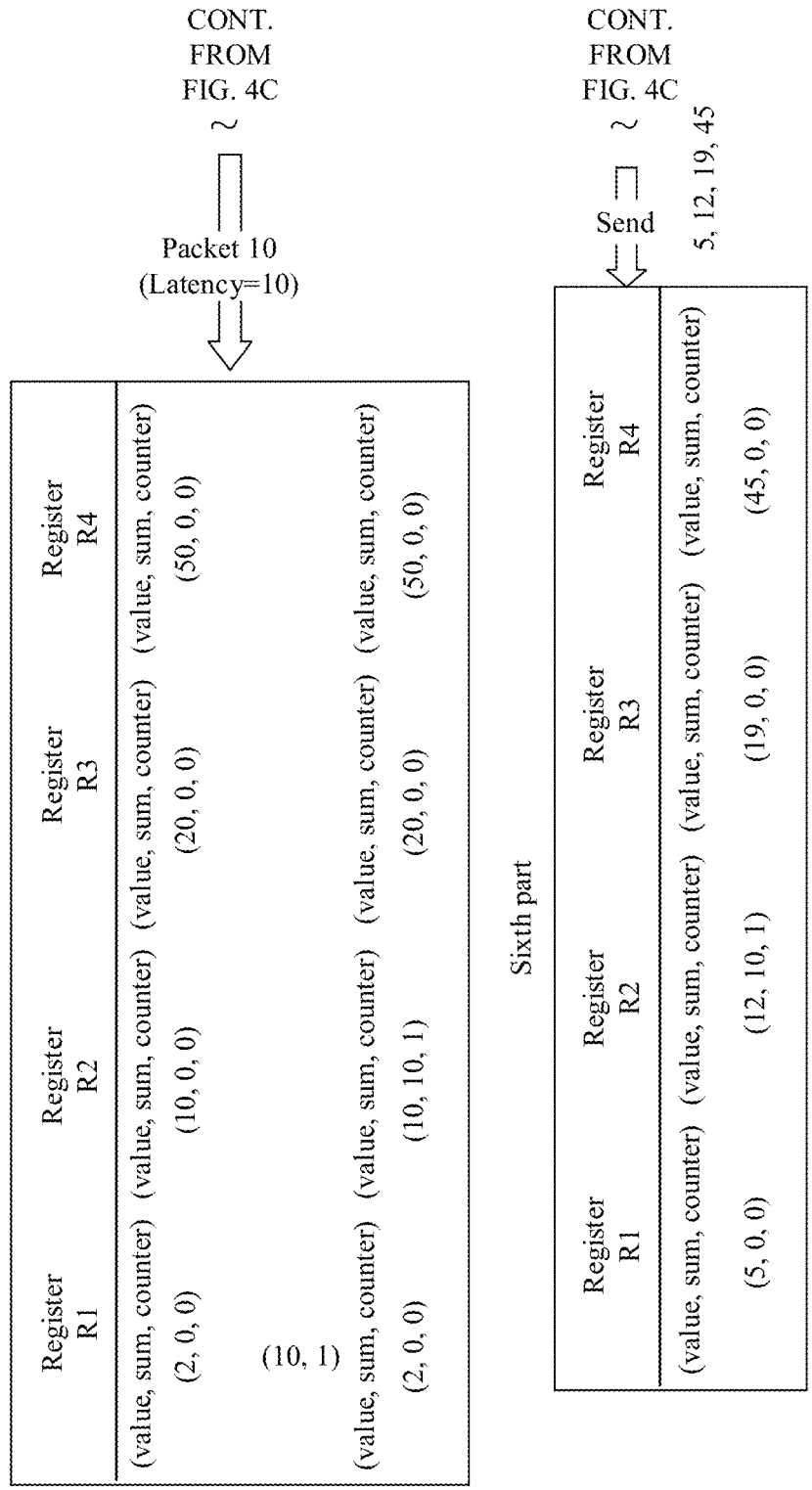

The scenario shown in FIG. 2 is used as an example to describe a procedure for the traffic monitoring method provided in embodiments of this application. Refer to FIG. 3. A traffic monitoring process may include: operation S11. The traffic collection apparatus 120 receives a packet 1, obtains a measurement value x of a target performance indicator of the packet 1, and stores value=x and counter=1 in R0. Operation S12. Determine that x matches a value of value in R1, update a value of sum in R1 based on x (to be specific, add x to the value of sum to obtain an updated value of sum in R1), and increase a value of counter in R1 by 1. Operation S13. Determine whether a batch update occurs. If yes, perform operation S14; otherwise, perform operation S16. Operation S14. Process monitoring results currently stored in operations R1 to R4, and send processed monitoring results to the control apparatus 110. Assuming that the unprocessed monitoring result is (value, sum, counter), the processed monitoring result sent to the control apparatus 110 may be represented as (value=sum/counter, counter). Operation S15. The control apparatus 110 obtains n groups of new monitoring data based on the four groups of monitoring results and stored n groups of historical monitoring data, and stores the n groups of new monitoring data; and the control apparatus 110 obtains four groups of new monitoring data based on the newly received four groups of monitoring results and the stored n groups of historical monitoring data, and sequentially uses value in the four groups of new monitoring data as value in the four registers R that is used before next batch processing. Operation S16. Determine whether a new packet is received. If yes, return to operation S11; otherwise, end the process.

In operation S11, that the traffic collection apparatus 120 receives a packet 1, and obtains a measurement value x of a target performance indicator of the packet 1 may be specifically: The network device in which the traffic collection apparatus 120 is located receives the packet 1, an NP chip in the network device extracts a packet header (or extracts a part of data in a payload and a packet header) from the packet 1, and the traffic collection apparatus 120 in the NP chip performs traffic monitoring based on the extracted part, and obtains the measurement value x of the target performance indicator of the packet 1.

In an example, a process in which the traffic collection apparatus 120 performs packet-by-packet latency statistics collection when receiving 11 packets is described based on the method shown in FIG. 3. A latency is measured in milliseconds in the following descriptions. An example in which values of value in registers R configured to store monitoring results are sorted in ascending order is used for description. When receiving a packet 1, the traffic collection apparatus 120 obtains a measurement value of the latency of the packet 1 as 2, stores value=2 and counter=1 in R0, and stores value=2 and counter=1 that are in R0 in R1, as shown in the first part in FIG. 4A to FIG. 4D. When receiving a packet 2, the traffic collection apparatus 120 obtains a measurement value of the latency of the packet 2 as 20, and stores value=20 and counter=1 in R0. Because 20 is greater than 2, value=20 and counter=1 in R0 are stored in R2, as shown in the second part in FIG. 4A to FIG. 4D. When receiving a packet 3, the traffic collection apparatus 120 obtains a measurement value of the latency of the packet 3 as 10, and stores value=10 and counter=1 in R0. Because 10 falls between 2 and 20, value=20, sum=20, and counter=1 in R2 are moved to R3, and value=10 and counter=1 in R0 are stored in R2, as shown in the third part in FIG. 4A to FIG. 4D. When receiving a packet 4, the traffic collection apparatus 120 obtains a measurement value of the latency of the packet 4 as 10, and stores value=10 and counter=1 in R0. Because 10 matches value in R2, value=10 and counter=1 in R0 are stored in R2, to be specific, a value of sum in R2 is increased by 10, and a value of counter in R2 is increased by 1. After this storage, in R2, value=10, sum=20, and counter=2, as shown in the fourth part in FIG. 4A to FIG. 4D. The rest can be deduced by analogy. After nine packets are received, for content stored in R1 to R4, refer to the fifth part in FIG. 4A to FIG. 4D. When receiving a packet 10, the traffic collection apparatus 120 obtains a measurement value of the latency of the packet 10 as 3, and stores value=3 and counter=1 in R0. In this case, it is determined that the latency, namely, 3, matches the latency, namely, 2, in R1, so that value=2, sum=10, and counter=4 that are stored in R1 are updated by using value=10 and counter=1 in R0 to obtain value=2, sum=(10+3)=13, and counter=(4+1)=5, and value=2, sum=13, and counter=5 are stored in R1. Content stored in R1 to R4 is shown in the sixth part in FIG. 4A to FIG. 4D. In this case, it is determined that a quantity of packets on which statistics are collected is 10, and a batch update needs to be performed. Therefore, (value=2, sum=10, counter=4), (value=10, sum=20, counter=2), (value=20, sum=39, counter=2), and (value=50, sum=50, counter=1) respectively in R1 to R4 are processed to obtain (v=13/5=2.6, counter=5), (v=20/2=10, counter=2), (v=39/2=19.5, counter=2), and (v=50, counter=1), the processed four groups of monitoring results are sent to the control apparatus 110, and values of sum and counter and in correspondences in R1 to R4 are cleared. In this case, the control apparatus 110 combines and processes the newly received four groups of monitoring results and stored n groups of historical monitoring data to obtain n groups of new monitoring data, and store the n groups of new monitoring data as a basis for subsequently combining monitoring results or a data source for analyzing the latency of the network device in which the traffic collection apparatus 120 is located. In addition, the control apparatus 110 combines and processes the newly received four groups of monitoring results and the stored n groups of historical monitoring data to obtain four groups of new monitoring data, and respectively delivers values, for example, (5, 12, 19, 45), of value in the four groups of new monitoring data to R1 to R4 in the traffic collection apparatus 120 as new values, of value in the registers R, that are used before a next batch update. The traffic collection apparatus 120 further collects statistics on a newly received packet when the control apparatus 110 performs the combination. For example, when receiving a packet 1', the traffic collection apparatus 120 obtains a measurement value of the latency of the packet 1' as 10, stores value=10 and counter=1 in R0, determines that 10 corresponds to value in R2, and updates a correspondence, namely, value=10, sum=0, and counter=0, in R2 by using value=10 and counter=1 in R0 to obtain value=10, sum=10, and counter=1 that are to be stored in R2. In this case, if new value sent by the control apparatus 110 is received, value in each register R may be updated, and updated content in R1 to R4 is respectively (value=5, sum=0, counter=0), (value=12, sum=10, counter=1), (value=19, sum=0, counter=0), and (value=45, sum=0, counter=0), as shown in the seventh part in FIG. 4A to FIG. 4D specifically. In this way, at any moment, the control apparatus 110 may analyze, based on the n groups of monitoring data that are stored in the control apparatus 110, the latency of the network device in which the traffic collection apparatus 120 is located. For example, values of counter in the n groups of monitoring data are normalized. A value of value in the n groups of monitoring data is used as a horizontal coordinate, and a normalizing result of the value of counter is used as a vertical coordinate, to obtain a probability distribution function (PDF) curve that is of the latency of the network device and that terminates at a moment at which the monitoring results are read. Then, the value of value in the n groups of monitoring data is used as a horizontal coordinate, and a vertical coordinate corresponding to each horizontal coordinate is an accumulated sum of normalizing results that are of values of counter in all monitoring data and that are less than the value of value and corresponding to the horizontal coordinate, to obtain a CDF curve that is of the latency of the network device and that terminates at a moment at which a statistical result is read.

It can be learned that, according to the traffic monitoring method provided in embodiments of this application, specific values of the performance indicator of all packets do not need to be stored, thereby saving storage resources of the network device. Furthermore, complex configuration is not required, so that statistics can be simply and accurately collected on the performance indicator of the network device packet by packet. Therefore, an actual running status of the network device can be accurately analyzed based on the statistical result.

In embodiments of this application, the network device is a device that is integrated with a traffic collection module provided in embodiments of this application and that can collect statistics on a performance indicator of received packets packet by packet, and may specifically include but is not limited to a switch, a router, a firewall, or the like.

In embodiments of this application, the performance indicator on which statistics are collected by the network device includes but is not limited to a latency, a packet size (which may also be referred to as a packet length), a packet receiving time interval, or queue usage.

With reference to the accompanying drawings, the following uses an embodiment to describe in detail a specific implementation of the traffic monitoring method in embodiments of this application.

Figure 5A:
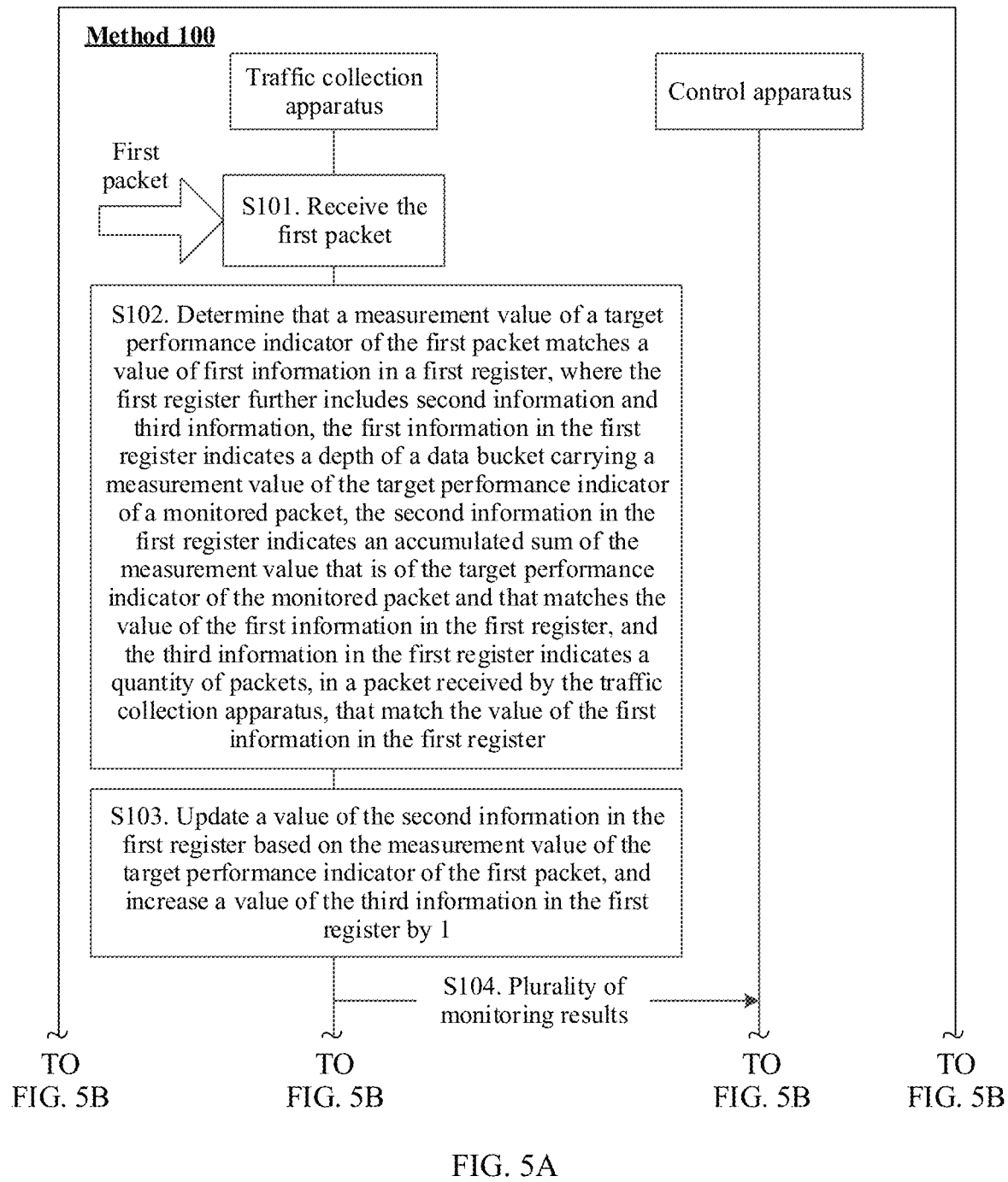
FIG. 5A and FIG. 5B are a schematic flowchart of a traffic monitoring method 100 according to an embodiment of this application.
Figure 5B:
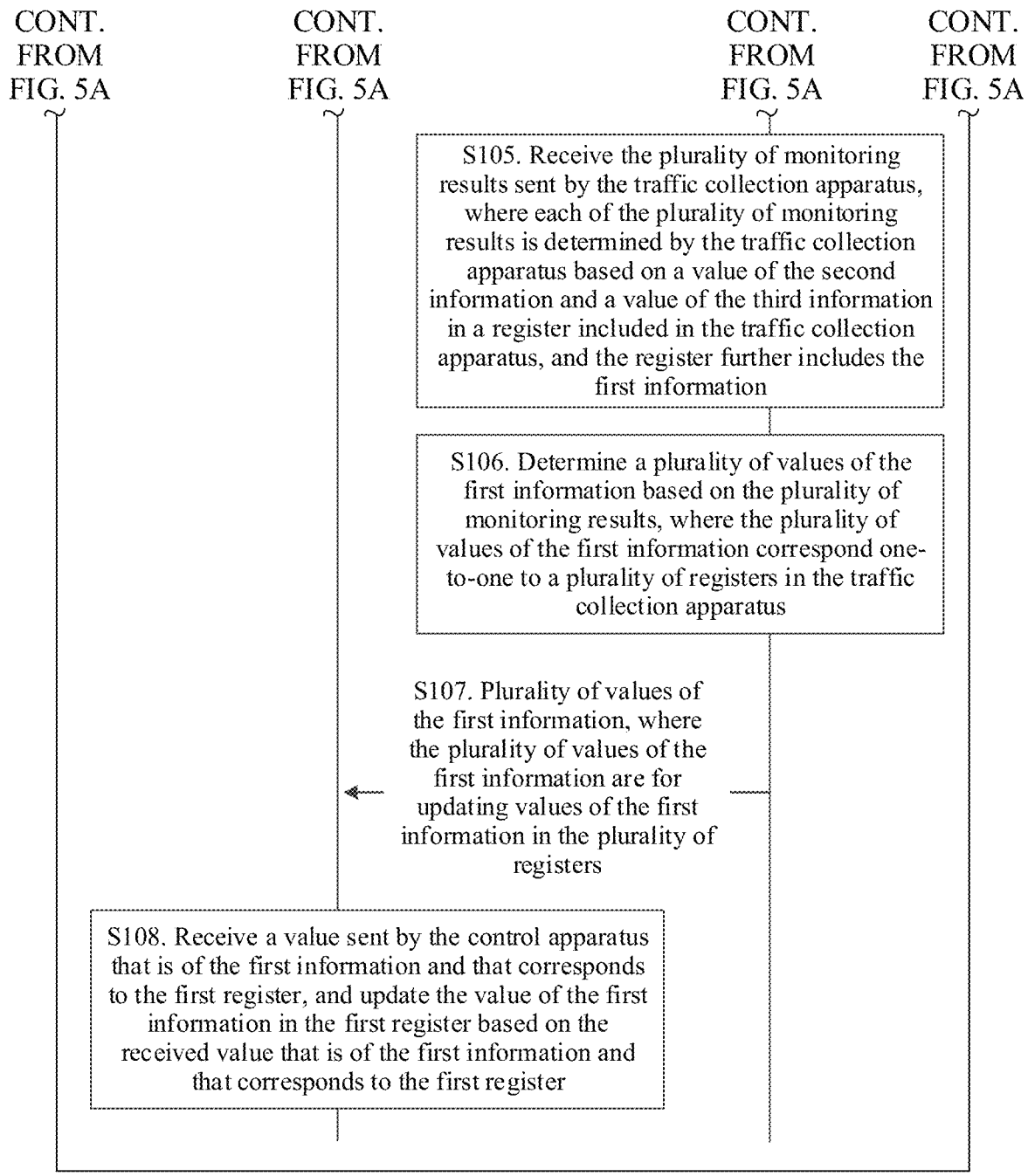

FIG. 5A and FIG. 5B are a schematic flowchart of a traffic monitoring method 100 according to an embodiment of this application. The method 100 is described from the perspective of interaction between a traffic collection apparatus and a control apparatus. The traffic collection apparatus may be, for example, the traffic collection apparatus 120 shown in FIG. 2, and the control apparatus may be, for example, the control apparatus 110 shown in FIG. 2. Operations performed by the traffic collection apparatus to collect statistics on different performance indicators are the same. In this embodiment of this application, an example in which the traffic collection apparatus collects statistics on a target performance indicator is used for description. The target performance indicator is any one of all performance indicators that can be monitored and on which statistics can be collected by the traffic collection apparatus.

The traffic collection apparatus includes a register configured to temporarily store a measurement value of a target performance indicator of a to-be-monitored packet and several registers configured to store a monitoring result of the target performance indicator. A quantity of registers configured to store the monitoring result of the target performance indicator is fixed. The register configured to temporarily store the measurement value of the target performance indicator of the to-be-monitored packet stores a value of first information and a value of third information of the target performance indicator of the to-be-monitored packet after receiving the to-be-monitored packet and before completing monitoring on the target performance indicator of the packet, where the value of the third information is 1.

In the following embodiment, the register configured to store the monitoring result of the target performance indicator includes the first information, second information, and the third information. The first information in each register indicates a depth of a data bucket carrying a measurement value of the target performance indicator of a monitored packet. For example, in FIG. 4A to FIG. 4D, the first information in each register is represented as value. Using R1 in the seventh part of FIG. 4A to FIG. 4D as an example, R1 includes a data bucket, and a depth of the data bucket corresponds to 2, to be specific, the first information in R1 indicates that the depth of the data bucket carrying a measurement value of the latency of a monitored packet is 2, in other words, a packet whose measurement value of the latency corresponds to 2 is monitored in R1. The second information in each register indicates an accumulated sum of the measurement value that is of the target performance indicator of the monitored packet and that matches a value of the first information in the register. For example, in FIG. 4A to FIG. 4D, the second information in each register is represented as sum. Using R2 in the fourth part of FIG. 4A to FIG. 4D as an example, the value of the second information in R2 is 20, indicating that an accumulated sum of measurement values that are of the target performance indicator of monitored packets and that match the value, namely, 10, of the first information in R2 is 20. The third information of each register indicates a quantity of packets, in one or more packets received by the traffic collection apparatus, whose measurement values of the target performance indicator match the value of the first information in the register. For example, in FIG. 4A to FIG. 4D, the third information in each register is represented as counter. Using R4 in the sixth part of FIG. 4A to FIG. 4D as an example, the value of the third information in R4 is 1, to be specific, one packet whose measurement value of the latency corresponds to 50 is monitored in R4. When a value of the second information and a value of the third information in the register are both 0, it indicates that a measurement value of the target performance indicator of no packet is monitored in the register, and indicates that the register is empty.

Refer to FIG. 5A and FIG. 5B. During specific implementation, the method 100 may include, for example, the following operations S101 to S108.

Operation S101. The traffic collection apparatus receives a first packet.

The first packet may be a service packet, or may be a control packet. This is not limited in this embodiment of this application.

During specific implementation, after a network device in which the traffic collection apparatus is located receives the first packet, an NP chip in the network device may extract a packet header (or extract a part of data in a payload and a packet header) from the first packet, and then the traffic collection apparatus in the NP chip performs traffic monitoring based on the extracted part.

Between operations S101 and S102, the traffic collection apparatus may obtain a measurement value of the target performance indicator of the first packet, and update, based on the measurement value, the value of the first information and the value of the third information in the register configured to temporarily store the measurement value of the target performance indicator of the to-be-monitored packet. An updated value of the first information in the register configured to temporarily store the measurement value of the target performance indicator of the to-be-monitored packet is the measurement value of the target performance indicator of the first packet, and an updated value of the third information in the register configured to temporarily store the measurement value of the target performance indicator of the to-be-monitored packet is 1. This provides a data basis for subsequently completing monitoring on the first packet.

Operation S102. The traffic collection apparatus determines that the measurement value of the target performance indicator of the first packet matches a value of the first information in a first register, where the first register further includes the second information and the third information, the first information in the first register indicates a depth of a data bucket carrying a measurement value of the target performance indicator of a monitored packet, the second information in the first register indicates an accumulated sum of the measurement value that is of the target performance indicator of the monitored packet and that matches the value of the first information in the first register, and the third information in the first register indicates a quantity of packets, in one or more packets received by the traffic collection apparatus, whose measurement values of the target performance indicator match the value of the first information in the first register.

In an example, that the traffic collection apparatus determines that the measurement value of the target performance indicator of the first packet matches a value of the first information in a first register may include: The traffic collection apparatus determines that the measurement value of the target performance indicator of the first packet falls within a value range corresponding to the value of the first information in the first register. For example, the value of the first information in the first register is 5, and the corresponding value range is 0 to 10. In this case, if the measurement value of the target performance indicator of the first packet is 7, it may be determined that the measurement value of the target performance indicator of the first packet matches the value of the first information in the first register. For another example, the value of the first information in the first register is 5, and the corresponding value range is 5±3. In this case, if the measurement value of the target performance indicator of the first packet is 7, it may be determined that the measurement value of the target performance indicator of the first packet matches the value of the first information in the first register.

In another example, that the traffic collection apparatus determines that the measurement value of the target performance indicator of the first packet matches a value of the first information in a first register may alternatively include: The traffic collection apparatus determines that a difference between the measurement value of the target performance indicator of the first packet and the value of the first information in the first register is less than a difference between the measurement value of the target performance indicator of the first packet and a value of the first information in another register. For example, the traffic collection apparatus includes the first register and a third register, the value of the first information in the first register is 5, and a value of the first information in the third register is 12. If the measurement value of the target performance indicator of the first packet is 7, because (7−5)<(12−7), it may be determined that the measurement value of the target performance indicator of the first packet matches the value of the first information in the first register.

It should be noted that, initially, the value of the first information in each register configured to store the monitoring result of the target performance indicator may be configured by a user, may be a random initial value automatically configured by a system, or may be determined through monitoring on the received packet in the manner shown in FIG. 4A to FIG. 4D. For example, when receiving a second packet, the traffic collection apparatus determines that the traffic collection apparatus includes a second register. A value of the second information and a value of the third information in the second register are both 0. This indicates that the second register is empty. In this case, in response to a case in which the traffic collection apparatus determines that the traffic collection apparatus includes the empty second register, the traffic collection apparatus updates a value of the first information in the second register to a measurement value of the target performance indicator of the second packet, updates the value of the second information in the second register to the measurement value of the target performance indicator of the second packet, and increases the value of the third information in the second register by 1. For details, refer to the related descriptions in FIG. 4A to FIG. 4D.

Operation S103. The traffic collection apparatus updates a value of the second information in the first register based on the measurement value of the target performance indicator of the first packet, and increases a value of the third information in the first register by 1.

During specific implementation, that the traffic collection apparatus updates a value of the second information in the first register based on the measurement value of the target performance indicator of the first packet in operation S103 may include, for example: The traffic collection apparatus adds the measurement value of the target performance indicator of the first packet and the value not updated of the second information in the first register, to obtain an updated value of the second information, and therefore replaces the value not updated of the second information in the first register with the updated value of the second information.

Operation S104. The traffic collection apparatus sends a plurality of monitoring results to the control apparatus, where each of the plurality of monitoring results is determined by the traffic collection apparatus based on a value of the second information and a value of the third information in the register included in the traffic collection apparatus, and the register further includes the first information.

Operation S105. The control apparatus receives the plurality of monitoring results sent by the traffic collection apparatus.

In a case, the network device in which the traffic collection apparatus is located may send the monitoring results to the control apparatus in batches periodically. For example, the traffic collection apparatus in the network device includes a timer, and the timer is for setting a periodicity for sending the monitoring results. Once the timer expires, the traffic collection apparatus may send, to the control apparatus, the monitoring result determined based on the value of the second information and the value of the third information that are stored in each register. In another case, the network device in which the traffic collection apparatus is located may send the monitoring results to the control apparatus in batches based on a trigger condition. For example, the trigger condition may be that counter in a specific register configured to store the monitoring result of the target performance indicator is greater than a first threshold. The first threshold may be a preset value (for example, 4), and the registers may correspond to a same first threshold or different first thresholds. Alternatively, the first threshold may be a preset proportion (for example, 60%) of a sum of values of counter in all the registers of the traffic collection apparatus. Alternatively, for example, the trigger condition may be that a sum of values of counter in all the registers is greater than a second threshold (for example, 10). In still another case, the network device in which the traffic collection apparatus is located may send the monitoring results to the control apparatus in batches based on a query request sent by the control apparatus. In other words, when the control apparatus needs to obtain the monitoring results from the traffic collection apparatus, the control apparatus sends the query request to the traffic collection apparatus, to indicate the traffic collection apparatus to send the monitoring results to the control apparatus. The control apparatus may send the query request periodically, and a periodicity may be fixed or may be dynamically adjusted based on received monitoring results. For example, when a sum of values, of counter in all the registers, in the monitoring results is less than a third threshold (for example, 50), the query request is sent to the traffic collection apparatus in a periodicity of 10 seconds; when a sum of values, of counter in all the registers, in the monitoring results is greater than or equal to the third threshold, the query request is sent to the traffic collection apparatus in a periodicity of 5 seconds. For another example, when a value, of counter in a specific register, in the monitoring result is greater than a preset proportion (for example, 70%) of a sum of values of counter in all the registers, the query request is sent to the traffic collection apparatus in a periodicity of 5 seconds; when a value, of counter in a specific register, in the monitoring result is less than or equal to a preset proportion (for example, 70%) of a sum of values of counter in all the registers, the query request is sent to the traffic collection apparatus in a periodicity of 10 seconds.

The traffic collection apparatus sends the plurality of monitoring results to the control apparatus, where the plurality of monitoring results include a monitoring result corresponding to the first register. In an example, the monitoring result corresponding to the first register may include the value of the second information in the first register and the value of the third information in the first register. In this way, after receiving the value of the second information in the first register and the value of the third information in the first register, the control apparatus may further calculate a value of fourth information in the first register based on the value of the second information in the first register and the value of the third information in the first register, where the fourth information indicates an average carrying the measurement value of the target performance indicator of the monitored packet. In another example, before operation S104, the traffic collection apparatus may alternatively calculate, based on the value of the second information and the value of the third information in the first register, a value that is of fourth information and that corresponds to the first register. In this case, the monitoring result corresponding to the first register may alternatively include the value that is of the fourth information and that corresponds to the first register and the value of the third information in the first register, where the fourth information indicates an average carrying the measurement value of the target performance indicator of the monitored packet.

In a process in which the traffic collection apparatus sends the plurality of monitoring results to the control apparatus, the monitoring results corresponding to the registers may be sent to the control apparatus by using one packet, or may be sent to the control apparatus by using a plurality of packets.

It should be noted that, when the traffic collection apparatus sends the plurality of monitoring results to the control apparatus, values of value in the registers may not be associated, and a sequence of values of value that correspond to the monitoring results may not be concerned either.

After operation S104, the traffic collection apparatus may clear the value of the second information and the value of the third information that are in a correspondence stored in each register, continue to collect statistics on the target performance indicator of a received packet by using the current first information until a new value that is of the first information and that is delivered by the control apparatus is received, and implement more accurate statistics collection by using the updated value of the first information.

Operation S106. The control apparatus determines a plurality of values of the first information based on the plurality of monitoring results, where the plurality of values of the first information correspond one-to-one to the plurality of registers in the traffic collection apparatus.

During specific implementation, for example, operation S106 may include: The control apparatus determines, based on the plurality of monitoring results including the value that is of the fourth information and that corresponds to the first register and the value of the third information in the first register, the plurality of values of the first information that correspond to the registers in the traffic collection apparatus.

After operation S105, the control apparatus performs operations in two respects: On one hand, the control apparatus may obtain M groups of new monitoring data based on received N groups of monitoring results and locally stored M groups of historical monitoring data. The M groups of new monitoring data are stored in the control apparatus, are processed with N groups of monitoring results received in batches next time, and are used as latest data for analyzing the target performance indicator of the network device in which the traffic collection apparatus is located. On the other hand, the control apparatus may perform operation S106, to be specific, obtain N groups of new monitoring data based on the received N groups of monitoring results and the locally stored M groups of historical monitoring data, and sort value in the N groups of new monitoring data in ascending order, where an $i^{th}$ register corresponds to an $i^{th}$ piece of updated monitoring data, so that a value of the first information and in the $i^{th}$ piece of updated monitoring data is denoted as a value that is of the first information and that corresponds to the $i^{th}$ register. In this way, the traffic collection apparatus performs more accurate batch statistics collection subsequently. N may be a quantity of registers included in the traffic collection apparatus that are configured to store the monitoring result of the target performance indicator, for example, N=4. M is a quantity of groups of monitoring data stored in the control apparatus, for example, M=20. The monitoring data may be combined, for example, in a summation manner, an averaging manner, or a weighted averaging manner. This is not specifically limited in embodiments of this application.

During specific implementation, as required, the control apparatus may analyze and determine probability distribution of the target performance indicator based on the stored M groups of monitoring data, to learn of the target performance indicator of the network device in which the traffic collection apparatus is located.

Operation S107. The control apparatus sends the plurality of values of the first information to the traffic collection apparatus, where the plurality of values of the first information are for updating values of the first information in the plurality of registers in the traffic collection apparatus.

It should be noted that in a process in which the control apparatus sends the plurality of values of the first information to the traffic collection apparatus, the values of the first information that correspond to the registers may be sent to the traffic collection apparatus by using one packet, or may be sent to the traffic collection apparatus by using a plurality of packets. This is not limited in this embodiment of this application.

When the control apparatus sends the plurality of values of the first information to the traffic collection apparatus, the registers need to be strictly associated to ensure that the registers are sorted in an order of the values of the first information. If the traffic collection apparatus and the control apparatus belong to the same network device, the control apparatus may send the plurality of values of the first information to the traffic collection apparatus through data exchange inside the network device. For exchanged data, a destination address to be written into corresponding to each value of the first information needs to be specified (where the destination address points to a register corresponding to the value of the first information), to ensure that the value of the first information can be accurately written into the corresponding register, and therefore the value of the first information in the register is updated. If the traffic collection apparatus and the control apparatus belong to different network devices, the control apparatus may send the plurality of values of the first information to the traffic collection apparatus through data exchange between the network devices. For exchanged data, a device identifier of the traffic collection apparatus and a destination address of a register to be written into corresponding to each value of the first information need to be specified, to ensure that the value of the first information can be accurately written into the corresponding register in the network device in which the traffic collection apparatus is located, and therefore the value of the first information in the register is updated. When the traffic collection apparatus receives the new values of the first information that are delivered by the control apparatus, the traffic collection apparatus may update the values of the first information in the correspondences stored in the registers to the received new values of the first information. For details, refer to the related descriptions of the seventh part in FIG. 4A to FIG. 4D. In this way, more accurate statistics collection can be implemented through updating of the values of the first information.

Operation S108. The traffic collection apparatus receives a value sent by the control apparatus that is of the first information and that corresponds to the first register, and updates the value of the first information in the first register based on the received value that is of the first information and that corresponds to the first register.

In operation S107, the control apparatus sends the plurality of values of the first information to the traffic collection apparatus, where the plurality of values include the value that is of the first information and that corresponds to the first register. In this case, when the traffic collection apparatus receives the value that is of the first information and that corresponds to the first register in operation S108, the traffic collection apparatus updates, based on the received value that is of the first information and that corresponds to the first register, the value that is of the first information and that already exists in the first register. For example, for R2 in the seventh part shown in FIG. 4A to FIG. 4D, when receiving the value, namely, 12, that is of the first information and that corresponds to R2, the traffic collection apparatus updates the value, namely, 10, of the first information in R2 to 12.

It can be learned that, according to the method 100, a value range of a to-be-monitored performance indicator (namely, the target performance indicator) does not need to be configured, and the value range does not need to be equally divided to determine a depth of each data bucket either. Instead, the first information indicating the depth of the data bucket that carries the measurement value of the target performance indicator of the monitored packet, the second information indicating the accumulated sum of the measurement value that is of the target performance indicator of the monitored packet and that matches the value of the first information in each register, and the third information indicating the quantity of packets, in the received packet, that match the value of the first information in each register are used as three statistical parameters of the register, to match the measurement value of the target performance indicator of the received packet with the value of the first information in each register, and flexibly update values of the two statistical parameters, namely, the second information and the third information, in a matched register, so that statistics on the target performance indicator are collected. This not only reduces configuration workload for collecting the statistics on the target performance indicator, but also makes it possible to obtain a more comprehensive and accurate statistical result because an entire statistical value range and a statistical value sub-range of each register are not limited.

It should be noted that, in the method 100, the quantity of registers participating in statistics collection does not need to be as large as possible in the traffic collection apparatus, because the registers send the phase-based monitoring results to the control apparatus in batches for processing and storage. The method 100 implements, through a combination of software and hardware, higher resource utilization and a more accurate statistical effect than a manner in which only a software algorithm is used for histogram statistics. It can be learned that the method 100 achieves a more prominent effect in a case in which the network device has a small quantity of available registers but has a high precision requirement on the monitoring result.

Based on the foregoing method embodiments, embodiments of this application further provide corresponding apparatuses. The following describes the apparatuses with reference to the accompanying drawings.

Figure 6:
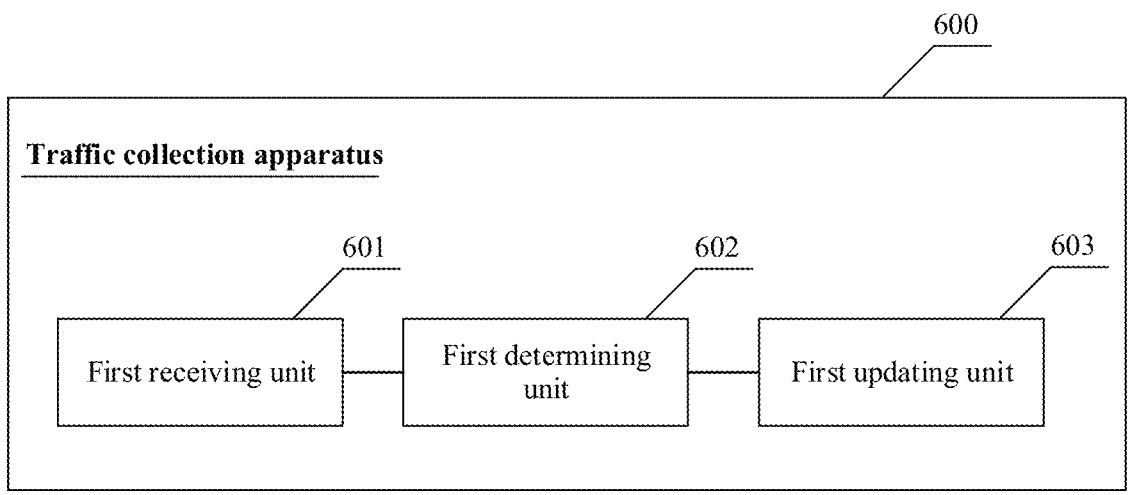
FIG. 6 is a schematic diagram of a structure of a traffic collection apparatus 600 according to an embodiment of this application.

FIG. 6 is a schematic diagram of a structure of a traffic collection apparatus 600 according to an embodiment of this application. The apparatus 600 may be, for example, the traffic collection apparatus 120, and perform the method shown in FIG. 3. The apparatus 600 may include a first receiving unit 601, a first determining unit 602, and a first updating unit 603.

The first receiving unit 601 is configured to receive a first packet.

For a specific implementation of the first receiving unit 601, refer to the detailed descriptions of operation S101 in the embodiment shown in FIG. 5A and FIG. 5B.

The first determining unit 602 is configured to determine that a measurement value of a target performance indicator of the first packet matches a value of first information in a first register, where the first register further includes second information and third information, the first information in the first register indicates a depth of a data bucket carrying a measurement value of the target performance indicator of a monitored packet, the second information in the first register indicates an accumulated sum of the measurement value that is of the target performance indicator of the monitored packet and that matches the value of the first information in the first register, and the third information in the first register indicates a quantity of packets, in one or more packets received by the traffic collection apparatus 600, whose measurement values of the target performance indicator match the value of the first information in the first register.

For a specific implementation of the first determining unit 602, refer to the detailed descriptions of operation S102 in the embodiment shown in FIG. 5A and FIG. 5B.

The first updating unit 603 is configured to: update a value of the second information in the first register based on the measurement value of the target performance indicator of the first packet, and increase a value of the third information in the first register by 1.

For a specific implementation of the first updating unit 603, refer to the detailed descriptions of operation S103 in the embodiment shown in FIG. 5A and FIG. 5B.

In an embodiment, the first determining unit 602 is specifically configured to determine that the measurement value of the target performance indicator of the first packet falls within a value range corresponding to the value of the first information in the first register. Alternatively, the first determining unit 602 is specifically configured to determine that a difference between the measurement value of the target performance indicator of the first packet and the value of the first information in the first register is less than a difference between the measurement value of the target performance indicator of the first packet and a value of the first information in another register.

In an embodiment, the first updating unit 603 is specifically configured to: add the measurement value of the target performance indicator of the first packet and the value not updated of the second information in the first register, to obtain an updated value of the second information; and replace the value not updated of the second information in the first register with the updated value of the second information.

In an embodiment, the apparatus 600 may further include a first sending unit. The first sending unit is configured to send a monitoring result to a control apparatus, where the monitoring result includes the value of the second information in the first register and the value of the third information in the first register; or the monitoring result includes a value that is of fourth information and that corresponds to the first register and the value of the third information in the first register, the fourth information indicates an average carrying the measurement value of the target performance indicator of the monitored packet, and the value of the fourth information is calculated by the traffic collection apparatus 600 based on the value of the second information and the value of the third information in the first register. For a specific implementation of the first sending unit, refer to the detailed descriptions of operations S104 and S105 in the embodiment shown in FIG. 5A and FIG. 5B.

In an example, the first sending unit is specifically configured to send the monitoring result to the control apparatus periodically.

In another example, the first sending unit is specifically configured to send the monitoring result to the control apparatus when it is determined that the value of the third information in the first register is greater than a first threshold. The first threshold may be a preset threshold, or may be a preset proportion of a sum of values of the third information in all registers of the traffic collection apparatus 600.

In still another example, the first sending unit is specifically configured to send the monitoring result to the control apparatus when it is determined that a sum of values of the third information in all registers of the traffic collection apparatus 600 is greater than a second threshold.

In an embodiment, the apparatus 600 may further include a second receiving unit. The second receiving unit is configured to: before the monitoring result is sent to the control apparatus, receive a query request sent by the control apparatus, where the query request indicates the traffic collection apparatus 600 to send the monitoring result to the control apparatus.

In an embodiment, the apparatus 600 may further include a clearing unit. The clearing unit is configured to clear the value of the second information and the value of the third information in the first register.

The monitoring result is used by the control apparatus to calculate an updated value that is of the first information and that corresponds to each register in the traffic collection apparatus 600.

In an embodiment, the apparatus 600 may further include a third receiving unit and a second updating unit. The second receiving unit is configured to receive a value sent by the control apparatus that is of the first information and that corresponds to the first register. The second updating unit is configured to update the value of the first information in the first register based on the received value that is of the first information and that corresponds to the first register. For specific implementations of the third receiving unit and the second updating unit, refer to the detailed descriptions of operations S107 and S108 in the embodiment shown in FIG. 5A and FIG. 5B.

In an embodiment, the apparatus 600 may further include a fourth receiving unit, a second determining unit, and a third updating unit. The fourth receiving unit is configured to receive a second packet. The second determining unit is configured to determine whether the traffic collection apparatus 600 includes a second register, where the second register includes the first information, the second information, and the third information, and a value of the second information and a value of the third information in the second register are both 0. The third updating unit is configured to: in response to a case in which it is determined that the traffic collection apparatus 600 includes the second register, update a value of the first information in the second register to a measurement value of the target performance indicator of the second packet, update the value of the second information in the second register to the measurement value of the target performance indicator of the second packet, and increase the value of the third information in the second register by 1.

In this embodiment of this application, the target performance indicator includes any one of the following indicators: a latency, a packet length, a packet receiving time interval, or queue usage.

In this embodiment of this application, the traffic collection apparatus 600 is included in a processing chip, for example, may be integrated into an NP chip.

For specific functions and implementations that can be performed by the traffic collection apparatus 600, refer to the corresponding descriptions of the traffic collection apparatus in the method shown in FIG. 3 and the method 100 shown in FIG. 5A and FIG. 5B. Details are not described herein again.

Figure 7:
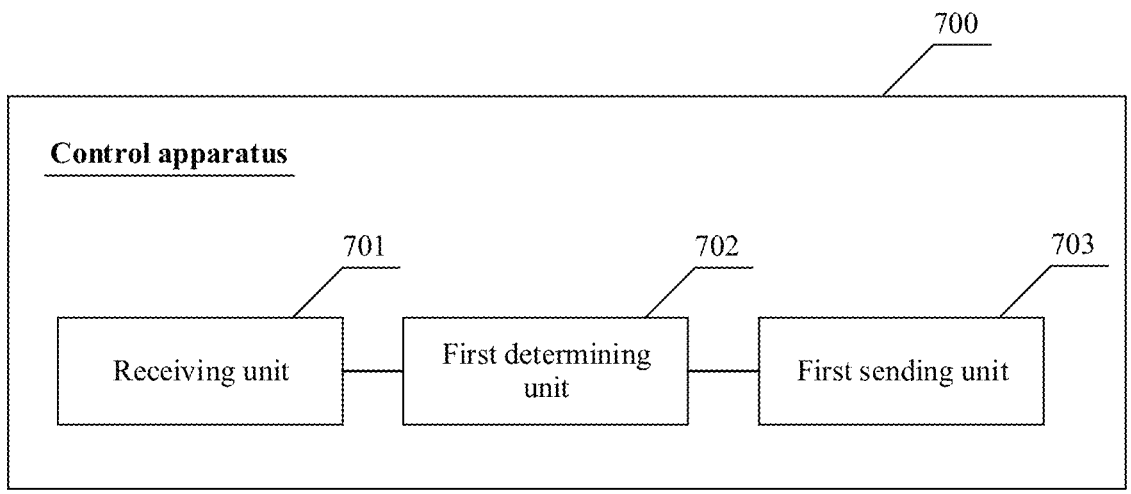
FIG. 7 is a schematic diagram of a structure of a control apparatus 700 according to an embodiment of this application.

Correspondingly, an embodiment of this application further provides a control apparatus 700, as shown in FIG. 7. The control apparatus 700 may include a receiving unit 701, a first determining unit 702, and a first sending unit 703.

The receiving unit 701 is configured to receive a plurality of monitoring results sent by a traffic collection apparatus, where each of the plurality of monitoring results is determined by the traffic collection apparatus based on a value of second information and a value of third information in a register included in the traffic collection apparatus. The register further includes first information. The first information indicates a depth of a data bucket carrying a measurement value of a target performance indicator of a monitored packet, the second information indicates an accumulated sum of the measurement value that is of the target performance indicator of the monitored packet and that matches a value of the first information in the register, and the third information indicates a quantity of packets, in one or more packets received by the traffic collection apparatus, whose measurement values of the target performance indicator match the value of the first information in the register.

For a specific implementation of the receiving unit 701, refer to the detailed descriptions of operation S105 in the embodiment shown in FIG. 5A and FIG. 5B.

The first determining unit 702 is configured to determine a plurality of values of the first information based on the plurality of monitoring results, where the plurality of values of the first information correspond one-to-one to a plurality of registers in the traffic collection apparatus.

For a specific implementation of the first determining unit 702, refer to the detailed descriptions of operation S106 in the embodiment shown in FIG. 5A and FIG. 5B.

The first sending unit 703 is configured to send the plurality of values of the first information to the traffic collection apparatus, where the plurality of values of the first information are for updating values of the first information in the plurality of registers in the traffic collection apparatus.

For a specific implementation of the first sending unit 703, refer to the detailed descriptions of operation S107 in the embodiment shown in FIG. 5A and FIG. 5B.

In an embodiment, the receiving unit 701 is specifically configured to receive a first monitoring result corresponding to a first register that is sent by the traffic collection apparatus, where the first monitoring result includes a value that is of fourth information and that corresponds to the first register and a value of the third information, the value of the fourth information is calculated by the traffic collection apparatus based on a value of the second information in the first register and the value of the third information in the first register, and the fourth information indicates an average carrying a measurement value of the target performance indicator of a monitored packet. Alternatively, the first monitoring result includes a value of the second information in the first register and a value of the third information in the first register. In this case, the apparatus 700 may further include a calculation unit. The calculation unit is configured to: before the plurality of values of the first information are determined based on the plurality of monitoring results, calculate, based on the value of the second information and the value of the third information in the first register, a value that is of fourth information and that corresponds to the first register, where the fourth information indicates an average carrying a measurement value of the target performance indicator of a monitored packet.

In this implementation, the first determining unit 702 is specifically configured to determine, based on the value that is of the fourth information and that corresponds to the first register and the value of the third information in the first register, the plurality of values of the first information that correspond to the registers in the traffic collection apparatus.

In an embodiment, the first determining unit 702 is specifically configured to: obtain N pieces of updated monitoring data based on N monitoring results and historical monitoring data, where N is a positive integer, and is a quantity of registers included in the traffic collection apparatus; determine an $i^{th}$ piece of updated monitoring data corresponding to an $i^{th}$ register in the N pieces of updated monitoring data, where i is an integer greater than or equal to 1 and less than or equal to N; and denote a value of the first information and in the $i^{th}$ piece of updated monitoring data as a value that is of the first information and that corresponds to the $i^{th}$ register.

In an embodiment, the apparatus 700 may further include an updating unit. The updating unit is configured to update the historical monitoring data based on the plurality of monitoring results and the historical monitoring data.

In an embodiment, the apparatus 700 may further include a second determining unit. The second determining unit is configured to determine probability distribution of the target performance indicator based on currently stored monitoring data.

In an embodiment, the apparatus 700 may further include a second sending unit. The second sending unit is configured to send a query request to the traffic collection apparatus before the plurality of monitoring results sent by the traffic collection apparatus are received, where the query request indicates the traffic collection apparatus to send the monitoring results to the control apparatus 700. In an example, the second sending unit is specifically configured to send the query request to the traffic collection apparatus periodically.

In this embodiment of this application, the target performance indicator includes any one of the following indicators: a latency, a packet length, a packet receiving time interval, or queue usage.

In this embodiment of this application, the traffic collection apparatus is included in a processing chip, for example, may be integrated into an NP chip.

For specific functions and implementations that can be performed by the control apparatus 700, refer to the corresponding descriptions of the control apparatus in the method shown in FIG. 3 and the method 100 shown in FIG. 5A and FIG. 5B. Details are not described herein again.

Figure 8:
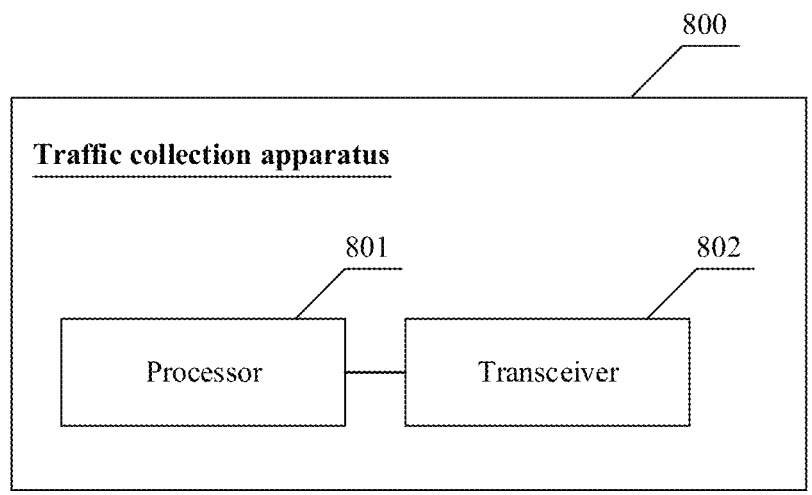
FIG. 8 is a schematic diagram of a structure of a traffic collection apparatus 800 according to an embodiment of this application.

An embodiment of this application further provides a traffic collection apparatus 800, as shown in FIG. 8. The apparatus 800 includes a processor 801 and a transceiver 802. The transceiver 802 is configured to receive a first packet. The processor 801 is configured to determine that a measurement value of a target performance indicator of the first packet matches a value of first information in a first register, where the first register further includes second information and third information, the first information in the first register indicates a depth of a data bucket carrying a measurement value of the target performance indicator of a monitored packet, the second information in the first register indicates an accumulated sum of the measurement value that is of the target performance indicator of the monitored packet and that matches the value of the first information in the first register, and the third information in the first register indicates a quantity of packets, in one or more packets received by the traffic collection apparatus 800, whose measurement values of the target performance indicator match the value of the first information in the first register. The processor 801 is further configured to: update a value of the second information in the first register based on the measurement value of the target performance indicator of the first packet, and increase a value of the third information in the first register by 1.

In an embodiment, the processor 801 is specifically configured to determine that the measurement value of the target performance indicator of the first packet falls within a value range corresponding to the value of the first information in the first register.

In an embodiment, the processor 801 is specifically configured to determine that a difference between the measurement value of the target performance indicator of the first packet and the value of the first information in the first register is less than a difference between the measurement value of the target performance indicator of the first packet and a value of the first information in another register.

In an embodiment, the processor 801 is specifically configured to: add the measurement value of the target performance indicator of the first packet and the value not updated of the second information in the first register, to obtain an updated value of the second information; and replace the value not updated of the second information in the first register with the updated value of the second information.

In an embodiment, the transceiver 802 is further configured to send a monitoring result to a control apparatus, where the monitoring result includes the value of the second information in the first register and the value of the third information in the first register.

In an embodiment, the transceiver 802 is further configured to send a monitoring result to a control apparatus, where the monitoring result includes a value that is of fourth information and that corresponds to the first register and the value of the third information in the first register, the fourth information indicates an average carrying the measurement value of the target performance indicator of the monitored packet, and the value of the fourth information is calculated by the traffic collection apparatus 800 based on the value of the second information and the value of the third information in the first register.

In an embodiment, the transceiver 802 is specifically configured to periodically send the monitoring result to the control apparatus.

In an embodiment, the transceiver 802 is specifically configured to send the monitoring result to the control apparatus when it is determined that the value of the third information in the first register is greater than a first threshold. The first threshold may be a preset threshold, or may be a preset proportion of a sum of values of the third information in all registers of the traffic collection apparatus 800.

In an embodiment, the transceiver 802 is specifically configured to send the monitoring result to the control apparatus when it is determined that a sum of values of the third information in all registers of the traffic collection apparatus 800 is greater than a second threshold.

In an embodiment, the transceiver 802 is further configured to: before the monitoring result is sent to the control apparatus, receive a query request sent by the control apparatus, where the query request indicates the traffic collection apparatus 800 to send the monitoring result to the control apparatus.

In an embodiment, the processor 801 is further configured to clear the value of the second information and the value of the third information in the first register.

In an embodiment, the monitoring result is used by the control apparatus to calculate an updated value that is of the first information and that corresponds to each register in the traffic collection apparatus 800.

In an embodiment, the transceiver 802 is further configured to receive a value sent by the control apparatus that is of the first information and that corresponds to the first register. The processor 801 is further configured to update the value of the first information in the first register based on the received value that is of the first information and that corresponds to the first register.

In an embodiment, the transceiver 802 is further configured to receive a second packet. The processor 801 is further configured to determine whether the traffic collection apparatus 800 includes a second register, where the second register includes the first information, the second information, and the third information, and values of the second information and the third information in the second register are both 0. The processor 801 is further configured to: in response to a case in which it is determined that the traffic collection apparatus 800 includes the second register, update a value of the first information in the second register to a measurement value of the target performance indicator of the second packet, update the value of the second information in the second register to the measurement value of the target performance indicator of the second packet, and increase the value of the third information in the second register by 1.

In this embodiment of this application, the target performance indicator includes any one of the following indicators: a latency, a packet length, a packet receiving time interval, or queue usage.

In this embodiment of this application, the traffic collection apparatus 800 is included in a processing chip, for example, may be integrated into an NP chip.

For specific functions and implementations that can be performed by the traffic collection apparatus 800, refer to the corresponding descriptions of the traffic collection apparatus in the method shown in FIG. 3 and the method 100 shown in FIG. 5A and FIG. 5B. Details are not described herein again.

Figure 9:
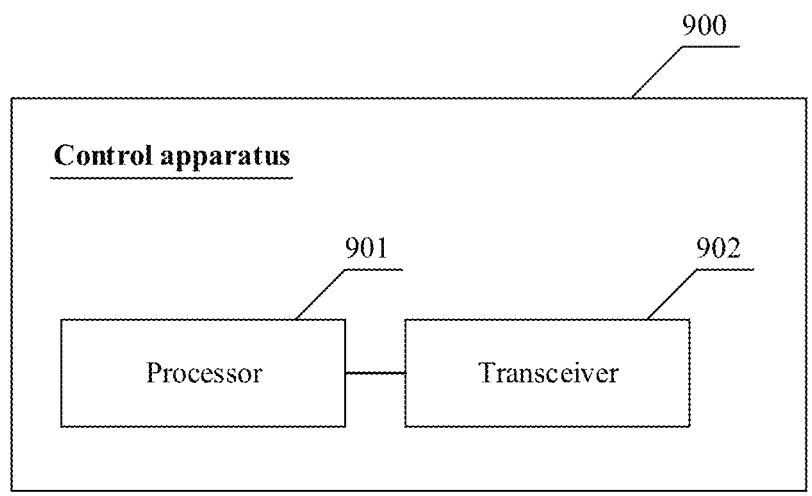
FIG. 9 is a schematic diagram of a structure of a control apparatus 900 according to an embodiment of this application.

An embodiment of this application further provides a control apparatus 900, as shown in FIG. 9. The apparatus 900 includes a transceiver 902 and a processor 901. The transceiver 902 is configured to receive a plurality of monitoring results sent by a traffic collection apparatus, where each of the plurality of monitoring results is determined by the traffic collection apparatus based on a value of second information and a value of third information in a register included in the traffic collection apparatus. The register further includes first information. The first information indicates a depth of a data bucket carrying a measurement value of a target performance indicator of a monitored packet, the second information indicates an accumulated sum of the measurement value that is of the target performance indicator of the monitored packet and that matches a value of the first information in the register, and the third information indicates a quantity of packets, in one or more packets received by the traffic collection apparatus, whose measurement values of the target performance indicator match the value of the first information in the register. The processor 901 is configured to determine a plurality of values of the first information based on the plurality of monitoring results, where the plurality of values of the first information correspond one-to-one to a plurality of registers in the traffic collection apparatus. The transceiver 902 is further configured to send the plurality of values of the first information to the traffic collection apparatus, where the plurality of values of the first information are for updating values of the first information in the plurality of registers in the traffic collection apparatus.

In an embodiment, the transceiver 902 is specifically configured to receive a first monitoring result corresponding to a first register that is sent by the traffic collection apparatus, where the first monitoring result includes a value that is of fourth information and that corresponds to the first register and a value of the third information, the value of the fourth information is calculated by the traffic collection apparatus based on a value of the second information in the first register and the value of the third information in the first register, and the fourth information indicates an average carrying a measurement value of the target performance indicator of a monitored packet.

In an embodiment, the transceiver 902 is specifically configured to receive a first monitoring result corresponding to a first register that is sent by the traffic collection apparatus, where the first monitoring result includes a value of the second information in the first register and a value of the third information in the first register.

In an embodiment, the processor 901 is further configured to: before the plurality of values of the first information are determined based on the plurality of monitoring results, calculate, based on the value of the second information and the value of the third information in the first register, a value that is of fourth information and that corresponds to the first register, where the fourth information indicates an average carrying a measurement value of the target performance indicator of a monitored packet. The processor 901 is specifically configured to determine, based on the value that is of the fourth information and that corresponds to the first register and the value of the third information in the first register, the plurality of values of the first information that correspond to the registers in the traffic collection apparatus.

In an embodiment, the processor 901 is specifically configured to: obtain N pieces of updated monitoring data based on N monitoring results and historical monitoring data, where N is a positive integer, and is a quantity of registers included in the traffic collection apparatus; determine an $i^{th}$ piece of updated monitoring data corresponding to an $i^{th}$ register in the N pieces of updated monitoring data, where i is an integer greater than or equal to 1 and less than or equal to N; and denote a value of the first information and in the $i^{th}$ piece of updated monitoring data as a value that is of the first information and that corresponds to the $i^{th}$ register.

In an embodiment, the processor 901 is further configured to update the historical monitoring data based on the plurality of monitoring results and the historical monitoring data.

In an embodiment, the processor 901 is further configured to determine probability distribution of the target performance indicator based on currently stored monitoring data.

In an embodiment, the transceiver 902 is configured to send a query request to the traffic collection apparatus before the plurality of monitoring results sent by the traffic collection apparatus are received, where the query request indicates the traffic collection apparatus to send the monitoring results to the control apparatus 900.

In an embodiment, the transceiver 902 is specifically configured to periodically send the query request to the traffic collection apparatus.

In this embodiment of this application, the target performance indicator includes any one of the following indicators: a latency, a packet length, a packet receiving time interval, or queue usage.

In this embodiment of this application, the traffic collection apparatus is included in a processing chip, for example, may be integrated into an NP chip.

For specific functions and implementations that can be performed by the control apparatus 900, refer to the corresponding descriptions of the control apparatus in the method shown in FIG. 3 and the method 100 shown in FIG. 5A and FIG. 5B. Details are not described herein again.

Figure 10:
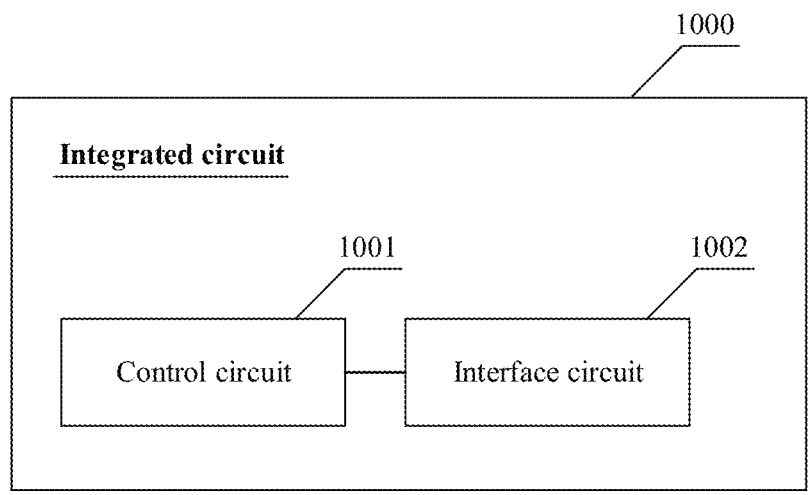
FIG. 10 is a schematic diagram of a structure of an integrated circuit 1000 according to an embodiment of this application.

In addition, an embodiment of this application further provides an integrated circuit 1000, as shown in FIG. 10. The integrated circuit 1000 includes a control circuit 1001 and an interface circuit 1002. The interface circuit 1002 is configured to receive a first packet. The control circuit 1001 is configured to determine that a measurement value of a target performance indicator of the first packet matches a value of first information in a first register, where the first register further includes second information and third information, the first information in the first register indicates a depth of a data bucket carrying a measurement value of the target performance indicator of a monitored packet, the second information in the first register indicates an accumulated sum of the measurement value that is of the target performance indicator of the monitored packet and that matches the value of the first information in the first register, and the third information in the first register indicates a quantity of packets, in one or more packets received by the integrated circuit 1000, whose measurement values of the target performance indicator match the value of the first information in the first register. The control circuit 1001 is further configured to: update a value of the second information in the first register based on the measurement value of the target performance indicator of the first packet, and increase a value of the third information in the first register by 1.

In an embodiment, the control circuit 1001 is specifically configured to determine that the measurement value of the target performance indicator of the first packet falls within a value range corresponding to the value of the first information in the first register.

In an embodiment, the control circuit 1001 is specifically configured to determine that a difference between the measurement value of the target performance indicator of the first packet and the value of the first information in the first register is less than a difference between the measurement value of the target performance indicator of the first packet and a value of the first information in another register.

In an embodiment, the control circuit 1001 is specifically configured to: add the measurement value of the target performance indicator of the first packet and the value not updated of the second information in the first register, to obtain an updated value of the second information; and replace the value not updated of the second information in the first register with the updated value of the second information.

In an embodiment, the interface circuit 1002 is further configured to send a monitoring result to a control apparatus, where the monitoring result includes the value of the second information in the first register and the value of the third information in the first register.

In an embodiment, the interface circuit 1002 is further configured to send a monitoring result to a control apparatus, where the monitoring result includes a value that is of fourth information and that corresponds to the first register and the value of the third information in the first register, the fourth information indicates an average carrying the measurement value of the target performance indicator of the monitored packet, and the value of the fourth information is calculated by the traffic collection apparatus based on the value of the second information and the value of the third information in the first register.

In an embodiment, the interface circuit 1002 is specifically configured to periodically send the monitoring result to the control apparatus.

In an embodiment, the interface circuit 1002 is specifically configured to send the monitoring result to the control apparatus when it is determined that the value of the third information in the first register is greater than a first threshold. The first threshold may be a preset threshold, or may be a preset proportion of a sum of values of the third information in all registers of the integrated circuit 1000.

In an embodiment, the interface circuit 1002 is specifically configured to send the monitoring result to the control apparatus when it is determined that a sum of values of the third information in all registers of the integrated circuit 1000 is greater than a second threshold.

In an embodiment, the interface circuit 1002 is further configured to: before the monitoring result is sent to the control apparatus, receive a query request sent by the control apparatus, where the query request indicates the integrated circuit 1000 to send the monitoring result to the control apparatus.

In an embodiment, the control circuit 1001 is further configured to clear the value of the second information and the value of the third information in the first register.

In an embodiment, the monitoring result is used by the control apparatus to calculate an updated value that is of the first information and that corresponds to each register in the integrated circuit 1000.

In an embodiment, the interface circuit 1002 is further configured to receive a value sent by the control apparatus that is of the first information and that corresponds to the first register. The control circuit 1001 is further configured to update the value of the first information in the first register based on the received value that is of the first information and that corresponds to the first register.

In an embodiment, the interface circuit 1002 is further configured to receive a second packet. The control circuit 1001 is further configured to determine whether the integrated circuit 1000 includes a second register, where the second register includes the first information, the second information, and the third information, and values of the second information and the third information in the second register are both 0. The control circuit 1001 is further configured to: in response to a case in which it is determined that the integrated circuit 1000 includes the second register, update a value of the first information in the second register to a measurement value of the target performance indicator of the second packet, update the value of the second information in the second register to the measurement value of the target performance indicator of the second packet, and increase the value of the third information in the second register by 1.

In this embodiment of this application, the target performance indicator includes any one of the following indicators: a latency, a packet length, a packet receiving time interval, or queue usage.

In this embodiment of this application, the integrated circuit 1000 is included in a processing chip, for example, may be integrated into an NP chip.

For specific functions and implementations that can be performed by the integrated circuit 1000, refer to the corresponding descriptions of the traffic collection apparatus in the method shown in FIG. 3 and the method 100 shown in FIG. 5A and FIG. 5B. Details are not described herein again.

Figure 11:
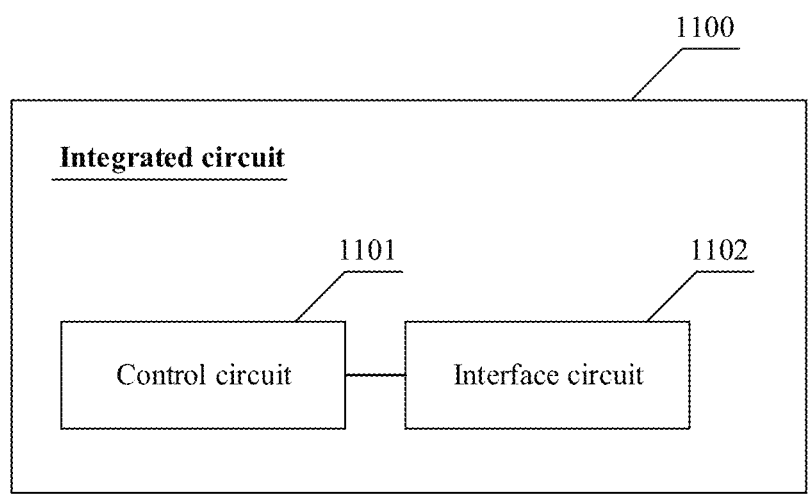
FIG. 11 is a schematic diagram of a structure of an integrated circuit 1100 according to an embodiment of this application.

Correspondingly, an embodiment of this application further provides an integrated circuit 1100, as shown in FIG. 11. The integrated circuit 1100 includes an interface circuit 1102 and a control circuit 1101. The interface circuit 1102 is configured to receive a plurality of monitoring results sent by a traffic collection apparatus, where each of the plurality of monitoring results is determined by the traffic collection apparatus based on a value of second information and a value of third information in a register included in the traffic collection apparatus. The register further includes first information. The first information indicates a depth of a data bucket carrying a measurement value of a target performance indicator of a monitored packet, the second information indicates an accumulated sum of the measurement value that is of the target performance indicator of the monitored packet and that matches a value of the first information in the register, and the third information indicates a quantity of packets, in one or more packets received by the traffic collection apparatus, whose measurement values of the target performance indicator match the value of the first information in the register. The control circuit 1101 is configured to determine a plurality of values of the first information based on the plurality of monitoring results, where the plurality of values of the first information correspond one-to-one to a plurality of registers in the traffic collection apparatus. The interface circuit 1102 is further configured to send the plurality of values of the first information to the traffic collection apparatus, where the plurality of values of the first information are for updating values of the first information in the plurality of registers in the traffic collection apparatus.

In an embodiment, the interface circuit 1102 is specifically configured to receive a first monitoring result corresponding to a first register that is sent by the traffic collection apparatus, where the first monitoring result includes a value that is of fourth information and that corresponds to the first register and a value of the third information, the value of the fourth information is calculated by the traffic collection apparatus based on a value of the second information in the first register and the value of the third information in the first register, and the fourth information indicates an average carrying a measurement value of the target performance indicator of a monitored packet.

In an embodiment, the interface circuit 1102 is specifically configured to receive a first monitoring result corresponding to a first register that is sent by the traffic collection apparatus, where the first monitoring result includes a value of the second information in the first register and a value of the third information in the first register.

In an embodiment, the control circuit 1101 is further configured to: before the plurality of values of the first information are determined based on the plurality of monitoring results, calculate, based on the value of the second information and the value of the third information in the first register, a value that is of fourth information and that corresponds to the first register, where the fourth information indicates an average carrying a measurement value of the target performance indicator of a monitored packet. In this case, the control circuit 1101 is specifically configured to determine, based on the value that is of the fourth information and that corresponds to the first register and the value of the third information in the first register, the plurality of values of the first information that correspond to the registers in the traffic collection apparatus.

In an embodiment, the control circuit 1101 is specifically configured to: obtain N pieces of updated monitoring data based on N monitoring results and historical monitoring data, where N is a positive integer, and is a quantity of registers included in the traffic collection apparatus; determine an $i^{th}$ piece of updated monitoring data corresponding to an $i^{th}$ register in the N pieces of updated monitoring data, where i is an integer greater than or equal to 1 and less than or equal to N; and denote a value of the first information in the $i^{th}$ piece of updated monitoring data as a value that is of the first information and that corresponds to the $i^{th}$ register.

In an embodiment, the control circuit 1101 is further configured to update the historical monitoring data based on the plurality of monitoring results and the historical monitoring data.

In an embodiment, the control circuit 1101 is further configured to determine probability distribution of the target performance indicator based on currently stored monitoring data.

In an embodiment, the interface circuit 1102 is configured to send a query request to the traffic collection apparatus before the plurality of monitoring results sent by the traffic collection apparatus are received, where the query request indicates the traffic collection apparatus to send the monitoring results to the integrated circuit.

In an embodiment, the interface circuit 1102 is specifically configured to periodically send the query request to the traffic collection apparatus.

In this embodiment of this application, the target performance indicator includes any one of the following indicators: a latency, a packet length, a packet receiving time interval, or queue usage.

In this embodiment of this application, the traffic collection apparatus is included in a processing chip, for example, may be integrated into an NP chip.

For specific functions and implementations that can be performed by the integrated circuit 1100, refer to the corresponding descriptions of the control apparatus in the method shown in FIG. 3 and the method 100 shown in FIG. 5A and FIG. 5B. Details are not described herein again.

Figure 12:
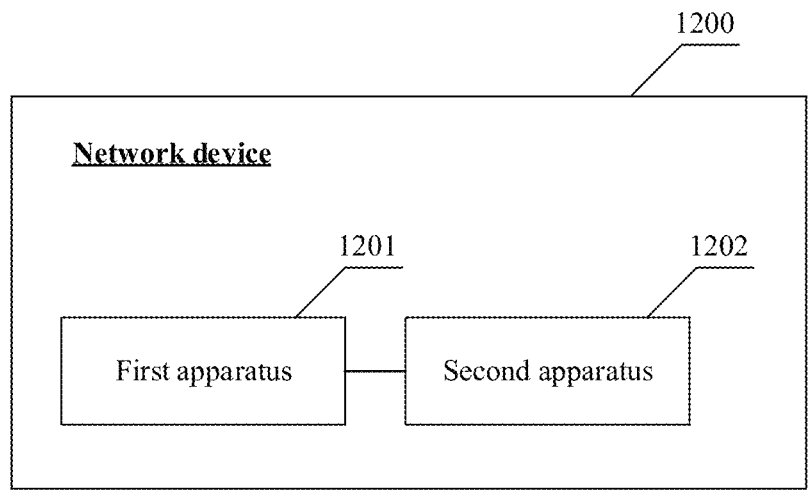
FIG. 12 is a schematic diagram of a structure of a network device 1200 according to an embodiment of this application.
Figure 13:
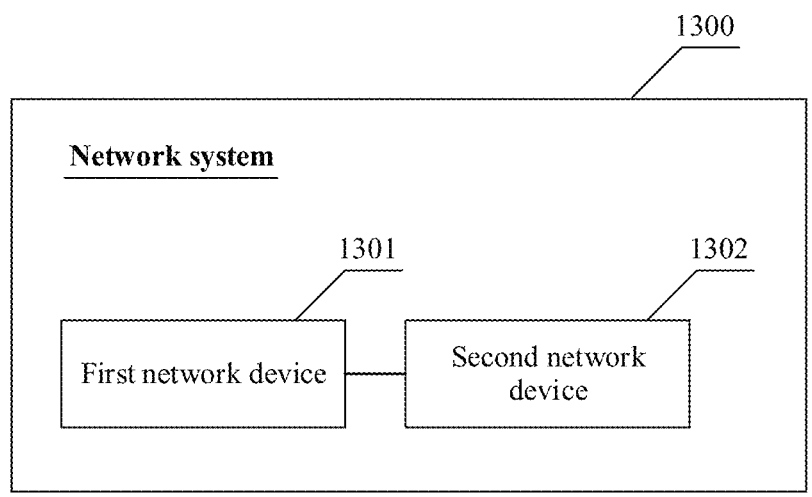
FIG. 13 is a schematic diagram of a structure of a network system 1300 according to FIG. 14 is a schematic diagram of a structure of a communication device 1400 according to an embodiment of this application.

An embodiment of this application further provides a network device 1200, as shown in FIG. 12. The network device 1200 may include a first apparatus 1201 and a second apparatus 1202. The first apparatus 1201 includes the traffic collection apparatus 120/600/800 or the integrated circuit 1000; and the second apparatus 1202 includes the control apparatus 110/700/900 or the integrated circuit 1100.

An embodiment of this application further provides a network system 1300. The network system 1300 includes a first network device 1301 and a second network device 1302. The first network device 1301 includes the traffic collection apparatus 120/600/800 or the integrated circuit 1000; and the second network device 1302 includes the control apparatus 110/700/900 or the integrated circuit 1100.

Figure 14:
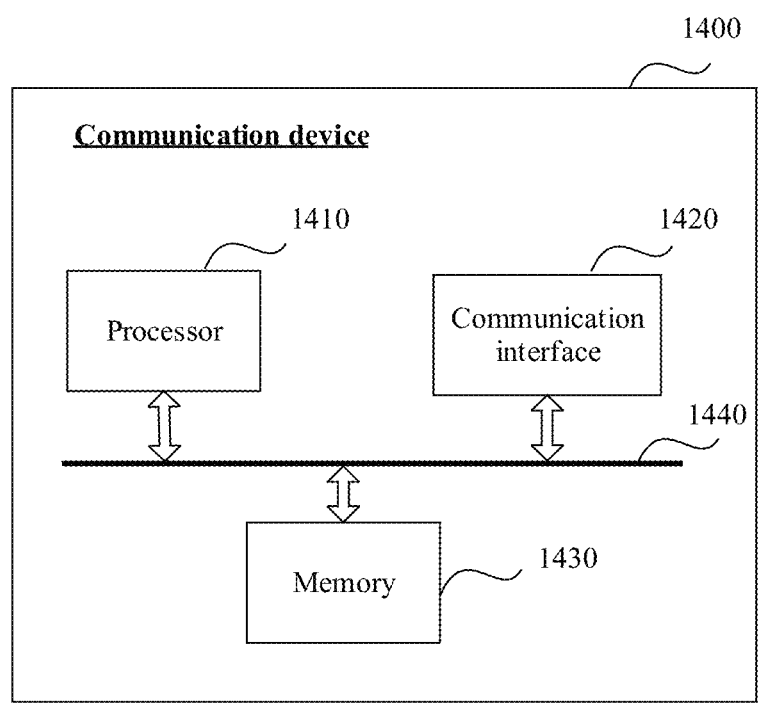

FIG. 14 is a schematic diagram of a structure of a communication device 1400 according to an embodiment of this application. For example, the communication device 1400 may be a network device in which the traffic collection apparatus 120 in the embodiment shown in FIG. 2 is located, may be a network device in which the traffic collection apparatus 600 in the embodiment shown in FIG. 6 is located, may be a network device in which the traffic collection apparatus 800 in the embodiment shown in FIG. 8 is located, or may be a network device in which the integrated circuit 1000 in the embodiment shown in FIG. 10 is located. Alternatively, for example, the communication device 1400 may be a network device in which the control apparatus 110 in the embodiment shown in FIG. 2 is located, may be a network device in which the control apparatus 700 in the embodiment shown in FIG. 7 is located, may be a network device in which the control apparatus 900 in the embodiment shown in FIG. 9 is located, or may be a network device in which the integrated circuit 1100 in the embodiment shown in FIG. 11 is located.

Refer to FIG. 14. The communication device 1400 includes a processor 1410, a communication interface 1420, and a memory 1430. There may be one or more processors 1410 in the communication device 1400, and one processor is used as an example in FIG. 14. In this embodiment of this application, the processor 1410, the communication interface 1420, and the memory 1430 may be connected through a bus system or in another manner. In FIG. 14, an example in which the processor 1410, the communication interface 1420, and the memory 1430 are connected through a bus system 1440 is used.

The processor 1410 may be a CPU, an NP, or a combination of a CPU and an NP. The processor 1410 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

The communication interface 1420 is configured to receive and send a packet. Specifically, the communication interface 1420 may include a receiving interface and a sending interface. The receiving interface may be configured to receive a packet, and the sending interface may be configured to send a packet. There may be one or more communication interfaces 1420.

The memory 1430 may include a volatile memory, for example, a random access memory (RAM), or may include a non-volatile memory, for example, a flash memory, a hard disk drive (HDD), or a solid-state drive (SSD). Alternatively, the memory 1430 may include a combination of the foregoing types of memories.

Optionally, the memory 1430 stores an operating system and a program, an executable module or a data structure, a subset thereof, or an extended set thereof. The program may include various operation instructions for implementing various operations. The operating system may include various system programs, to implement various basic services and process a hardware-based task. The processor 1410 may read the program in the memory 1430, to implement the traffic monitoring method provided in embodiments of this application.

The memory 1430 may be a storage component in the communication device 1400, or may be a storage apparatus independent of the communication device 1400.

The bus system 1440 may be a peripheral component interconnect (PCI) bus, an extended industry standard architecture (EISA) bus, or the like. The bus system 1440 may be classified into an address bus, a data bus, a control bus, and the like. For ease of representation, only one thick line is used to represent the bus in FIG. 14, but this does not mean that there is only one bus or only one type of bus.

Figure 15:
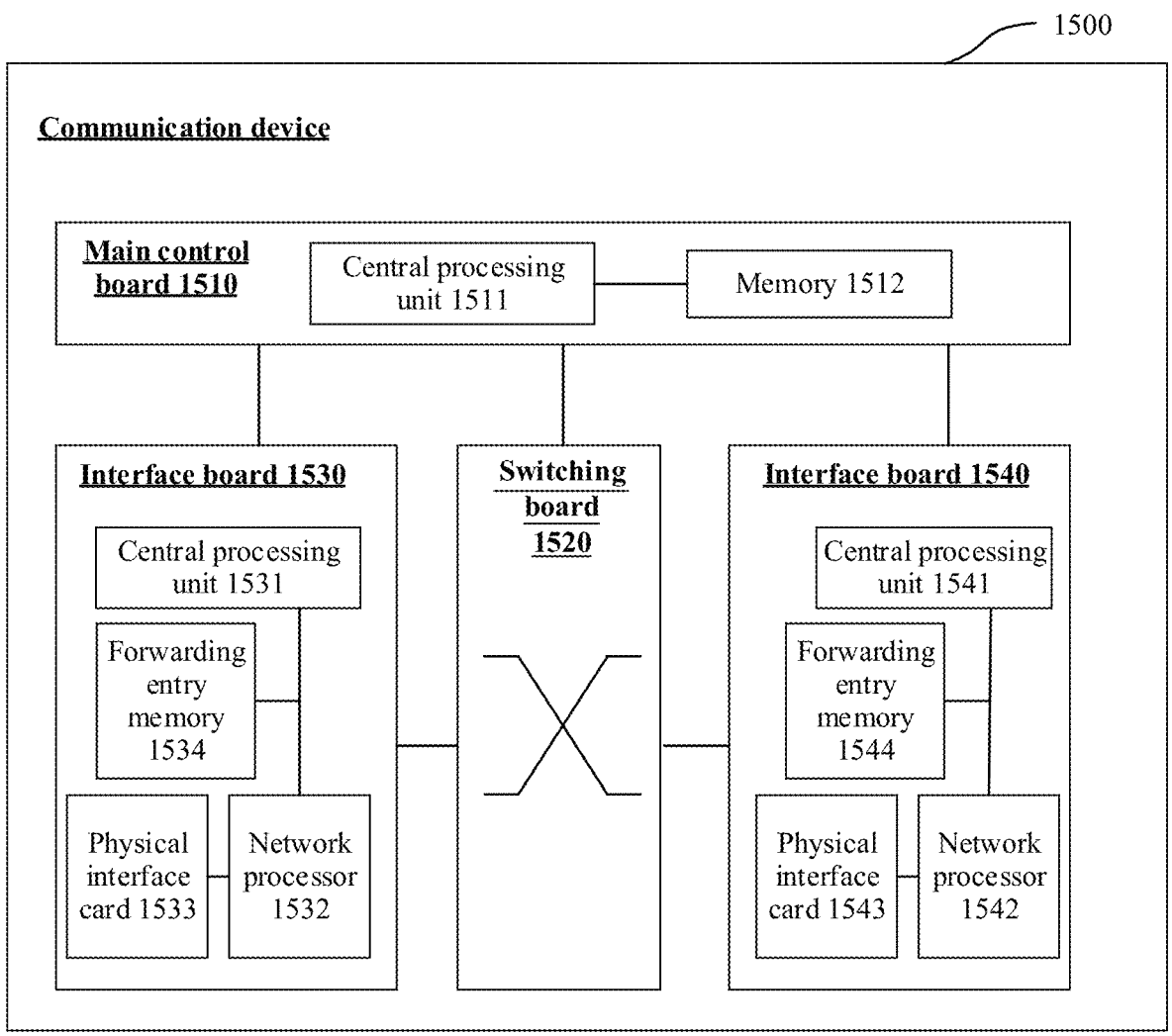
FIG. 15 is a schematic diagram of a structure of a communication device 1500 according to an embodiment of this application.

FIG. 15 is a schematic diagram of a structure of another communication device 1500 according to an embodiment of this application. For example, the communication device 1500 may be a network device in which the traffic collection apparatus 120 in the embodiment shown in FIG. 2 is located, may be a network device in which the traffic collection apparatus 600 in the embodiment shown in FIG. 6 is located, may be a network device in which the traffic collection apparatus 800 in the embodiment shown in FIG. 8 is located, or may be a network device in which the integrated circuit 1000 in the embodiment shown in FIG. 10 is located. Alternatively, for example, the communication device 1500 may be a network device in which the control apparatus 110 in the embodiment shown in FIG. 2 is located, may be a network device in which the control apparatus 700 in the embodiment shown in FIG. 7 is located, may be a network device in which the control apparatus 900 in the embodiment shown in FIG. 9 is located, or may be a network device in which the integrated circuit 1100 in the embodiment shown in FIG. 11 is located.

The communication device 1500 includes a main control board 1510 and an interface board 1530.

The main control board 1510 is also referred to as a main processing unit (MPU) or a route processor card. The main control board 1510 controls and manages components in the communication device 1500, where functions include routing calculation, device management, device maintenance, and protocol processing. The main control board 1510 includes a central processing unit 1511 and a memory 1512.

The interface board 1530 is also referred to as a line processing unit (LPU), a line card, or a service board. The interface board 1530 is configured to provide various service interfaces and forward a data packet. The service interface includes but is not limited to an Ethernet interface, a POS (Packet over SONET/SDH) interface, and the like. The Ethernet interface is, for example, a flexible Ethernet service interface (FlexE Clients). The interface board 1530 includes a central processing unit 1531, a network processor 1532, a forwarding entry memory 1534, and a physical interface card (PIC) 1533.

The central processing unit 1531 on the interface board 1530 is configured to control and manage the interface board 1530, and communicate with the central processing unit 1511 on the main control board 1510.

The network processor 1532 is configured to forward a packet. A form of the network processor 1532 may be a forwarding chip. Specifically, processing on an uplink packet includes processing at a packet ingress interface and forwarding table lookup, and processing on a downlink packet includes forwarding table lookup and the like.

The physical interface card 1533 is configured to implement a physical layer interconnection function. Original traffic enters the interface board 1530 from the physical interface card 1533, and a processed packet is sent from the physical interface card 1533. The physical interface card 1533 includes at least one physical interface, and the physical interface is also referred to as a physical port. The physical interface card 1533 corresponds to a FlexE physical interface in a system architecture. The physical interface card 1533 is also referred to as a subcard, may be installed on the interface board 1530, and is configured to: convert an optoelectronic signal into a packet, perform validity check on the packet, and then forward the packet to the network processor 1532 for processing. In some embodiments, the central processing unit 1531 on the interface board 1530 may also perform a function of the network processor 1532, for example, implement software forwarding based on a general-purpose CPU, so that the network processor 1532 is not required in the physical interface card 1533.

Optionally, the communication device 1500 includes a plurality of interface boards. For example, the communication device 1500 further includes an interface board 1540. The interface board 1540 includes a central processing unit 1541, a network processor 1542, a forwarding entry memory 1544, and a physical interface card 1543.

Optionally, the communication device 1500 further includes a switching board 1520. The switching board 1520 may also be referred to as a switch fabric unit (SFU). When the communication device has a plurality of interface boards 1530, the switching board 1520 is configured to complete data exchange between the interface boards. For example, the interface board 1530 and the interface board 1540 may communicate with each other via the switching board 1520.

The main control board 1510 is coupled to the interface board 1530. For example, the main control board 1510, the interface boards 1530 and 1540, and the switching board 1520 are connected to a system backboard through a system bus for communication. In an embodiment, an inter-process communication (IPC) channel is established between the main control board 1510 and the interface board 1530, and the main control board 1510 communicates with the interface board 1530 through the IPC channel.

Logically, the communication device 1500 includes a control plane and a forwarding plane. The control plane includes the main control board 1510 and the central processing unit 1531. The forwarding plane includes components that perform forwarding, such as the forwarding entry memory 1534, the physical interface card 1533, and the network processor 1532. The control plane performs functions such as routing, generating a forwarding table, processing signaling and a protocol packet, and configuring and maintaining a device status. The control plane delivers the generated forwarding table to the forwarding plane. On the forwarding plane, based on the forwarding table delivered from the control plane, the network processor 1532 looks up the table, and forwards a packet received by the physical interface card 1533. The forwarding table delivered from the control plane may be stored in the forwarding entry memory 1534. In some embodiments, the control plane and the forwarding plane may be completely separated, and are not on a same device.

If the communication device 1500 is configured as the traffic collection apparatus 120, the central processing unit 1511 may determine that a measurement value of a target performance indicator of a first packet matches a value of first information in a first register, update a value of second information in the first register based on the measurement value of the target performance indicator of the first packet, and increase a value of third information in the first register by 1. The network processor 1532 may trigger the physical interface card 1533 to receive the first packet.

It should be understood that the transceiver 802 in the traffic collection apparatus 800 may be equivalent to the physical interface card 1533 or the physical interface card 1543 in the communication device 1500, and the processor 801 in the traffic collection apparatus 800 may be equivalent to the central processing unit 1511 or the central processing unit 1531 in the communication device 1500. The first receiving unit 601 in the traffic collection apparatus 600 may be equivalent to the physical interface card 1533 or the physical interface card 1543 in the communication device 1500, and the first determining unit 602, the first updating unit 603, and the like in the traffic collection apparatus 600 may be equivalent to the central processing unit 1511 or the central processing unit 1531 in the communication device 1500.

It should be understood that the transceiver 902 in the control apparatus 900 may be equivalent to the physical interface card 1533 or the physical interface card 1543 in the communication device 1500, and the processor 901 in the control apparatus 900 may be equivalent to the central processing unit 1511 or the central processing unit 1531 in the communication device 1500. The receiving unit 701, the first sending unit 703, and the like in the control apparatus 700 may be equivalent to the physical interface card 1533 or the physical interface card 1543 in the communication device 1500, and the first determining unit 702 in the control apparatus 700 may be equivalent to the central processing unit 1511 or the central processing unit 1531 in the communication device 1500.

It should be understood that, in this embodiment of this application, an operation on the interface board 1540 is consistent with an operation on the interface board 1530. For brevity, details are not described again. It should be understood that the communication device 1500 in this embodiment may correspond to the traffic collection apparatus or the integrated circuit in the foregoing method embodiments. The main control board 1510, and the interface board 1530 and/or the interface board 1540 in the communication device 1500 may implement the functions of and/or the operations implemented by the traffic collection apparatus or the control apparatus in the foregoing method embodiments. For brevity, details are not described herein again.

It should be understood that, there may be one or more main control boards. When there are a plurality of main control boards, the main control boards may include an active main control board and a standby main control board. There may be one or more interface boards. A stronger data processing capability of the communication device indicates a larger quantity of provided interface boards. There may also be one or more physical interface cards on the interface board. There may be no switching board or one or more switching boards. When there are a plurality of switching boards, load balancing and redundancy backup may be implemented through cooperation of the switching boards. In a centralized forwarding architecture, the communication device may not need a switching board, and the interface board undertakes a service data processing function of an entire system. In a distributed forwarding architecture, the communication device may have at least one switching board, and data is exchanged between a plurality of interface boards through the switching board, to provide a capability of exchanging and processing a large capacity of data. Therefore, a data access and processing capability of the communication device in the distributed architecture is greater than that of the device in the centralized architecture. Optionally, the communication device may be in a form with only one card, in other words, there is no switching board, and functions of the interface board and the main control board are integrated on the card. In this case, the central processing unit on the interface board and the central processing unit on the main control board may be combined into one central processing unit on the card, to perform functions obtained after the two central processing units are combined. A device in this form (for example, a low-end switch or a router) has a low data exchanging and processing capability. Which architecture is specifically used depends on a specific networking deployment scenario.

In some possible embodiments, each network device or communication device above may be implemented as a virtualized device. For example, the virtualized device may be a virtual machine (VM) on which a program having a packet sending function is run, and the virtual machine is deployed on a hardware device (for example, a physical server). The virtual machine is a complete software-simulated computer system that has complete hardware system functions and that runs in a completely isolated environment. The virtual machine may be configured as each network device in FIG. 1. For example, each network device or communication device may be implemented based on a general-purpose physical server in combination with a network functions virtualization (NFV) technology. Each network device or communication device is a virtual host, a virtual router, or a virtual switch. By reading this application, persons skilled in the art may obtain, on the general-purpose physical server through virtualization with reference to the NFV technology, the network device or communication device having the foregoing functions. Details are not described herein.

It should be understood that the foregoing communication devices in various product forms separately have any function of the network device or communication device in the foregoing method embodiments. Details are not described herein.

An embodiment of this application further provides a chip, including a processor and an interface circuit. The interface circuit is configured to receive instructions and transmit the instructions to the processor. For example, the processor may be a specific implementation form of the traffic collection apparatus or the control apparatus in embodiments of this application, and may be configured to perform the foregoing traffic monitoring method. The processor is coupled to a memory, and the memory is configured to store a program or instructions. When the program or the instructions is/are executed by the processor, the chip system is enabled to implement the method in any one of the foregoing method embodiments.

Optionally, there may be one or more processors in the chip system. The processor may be implemented by hardware, or may be implemented by software. When the processor is implemented by the hardware, the processor may be a logic circuit, an integrated circuit, or the like. When the processor is implemented by the software, the processor may be a general-purpose processor, and is implemented by reading software code stored in the memory.

Optionally, there may also be one or more memories in the chip system. The memory may be integrated with the processor, or may be separated from the processor. This is not limited in this application. For example, the memory may be a non-transitory memory, for example, a read-only memory ROM. The memory and the processor may be integrated into a same chip, or may be separately disposed on different chips. A type of the memory and a manner of disposing the memory and the processor are not specifically limited in this application.

For example, the chip system may be a field programmable gate array (FPGA), an application-specific integrated circuit (ASIC), a system-on-a-chip (SoC), a central processing unit (CPU), a network processor (NP), a digital signal processor (DSP), a microcontroller unit (MCU), a programmable logic device (PLD), or another integrated chip.

An embodiment of this application further provides a computer-readable storage medium, including instructions or a computer program. When the instructions or the computer program are/is run on a computer, the computer is enabled to perform the traffic monitoring method in the foregoing embodiments.

An embodiment of this application further provides a computer program product including instructions or a computer program. When the computer program product runs on a computer, the computer is enabled to perform the traffic monitoring method in the foregoing embodiments.

In the specification, claims, and accompanying drawings of this application, the terms "first", "second", "third", "fourth", and the like (if existent) are intended to distinguish between similar objects but do not necessarily indicate a specific order or sequence. It should be understood that data termed in such a way is interchangeable in proper circumstances, so that embodiments described herein can be implemented in other orders than the order illustrated or described herein. Moreover, the terms "include", "contain" and any other variants mean to cover non-exclusive inclusion. For example, a process, method, system, product, or device that includes a list of operations or units is not necessarily limited to those expressly listed operations or units, but may include other operations or units that are not expressly listed or inherent to the process, method, product, or device.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, division into units is merely logical service division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form, a mechanical form, or another form.

The units described as separate parts may or may not be physically separate, and parts displayed as units may or may not be physical units, in other words, may be located in one position, or may be distributed on a plurality of network units. Some or all of the units may be selected based on an actual requirement to achieve the objectives of the solutions of embodiments.

In addition, service units in embodiments of this application may be integrated into one processing unit, each of the units may exist alone physically, or two or more units may be integrated into one unit. The integrated unit may be implemented in a form of hardware, or may be implemented in a form of a software service unit.

When the integrated unit is implemented in a form of a software service unit and sold or used as an independent product, the integrated unit may be stored in a computer-readable storage medium. Based on such an understanding, technical solutions of this application essentially, the part contributing to the prior art, or all or some of the technical solutions may be implemented in a form of a software product. The computer software product is stored in a storage medium and includes several instructions for instructing a computer device (which may be a personal computer, a server, a network device, or the like) to perform all or some of the operations of the methods in embodiments of this application. The foregoing storage medium includes: any medium that can store program code, such as a USB flash drive, a removable hard disk, a read-only memory (ROM), a random access memory (RAM), a magnetic disk, or an optical disc.

Persons skilled in the art should be aware that, in the foregoing one or more examples, services described in the present application may be implemented by hardware, software, firmware, or any combination thereof. When the services are implemented by the software, the services may be stored in a computer-readable medium or transmitted as one or more instructions or code in the computer-readable medium. The computer-readable medium includes a computer storage medium and a communication medium, where the communication medium includes any medium that enables a computer program to be transmitted from one place to another. The storage medium may be any available medium accessible to a general-purpose or a special-purpose computer.

The objectives, technical solutions, and beneficial effects of the present application have been further described in detail in the foregoing specific implementations. It should be understood that the foregoing descriptions are merely specific implementations of the present application.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A traffic monitoring method, comprising:
   receiving, by a traffic collection apparatus, a first packet;
   determining, by the traffic collection apparatus, that a measurement value of a target performance indicator of the first packet matches a value of first information in a first register, wherein the first register further comprises second information and third information, the first information in the first register indicates a depth of a data bucket carrying a measurement value of the target performance indicator of a monitored packet, the second information in the first register indicates an accumulated sum of the measurement value that is of the target performance indicator of the monitored packet and that matches the value of the first information in the first register, and the third information in the first register indicates a quantity of packets, in one or more packets received by the traffic collection apparatus, that match the value of the first information in the first register; and
   updating, by the traffic collection apparatus, a value of the second information in the first register based on the measurement value of the target performance indicator of the first packet, and increasing a value of the third information in the first register by 1.

2. The method according to claim 1, wherein the determining, by the traffic collection apparatus, that a measurement value of a target performance indicator of the first packet matches a value of first information in a first register comprises:
   determining, by the traffic collection apparatus, that the measurement value of the target performance indicator of the first packet falls within a value range corresponding to the value of the first information in the first register.

3. The method according to claim 1, wherein the determining, by the traffic collection apparatus, that a measurement value of a target performance indicator of the first packet matches a value of first information in a first register comprises:
   determining, by the traffic collection apparatus, that a difference between the measurement value of the target performance indicator of the first packet and the value of the first information in the first register is less than a difference between the measurement value of the target performance indicator of the first packet and a value of the first information in another register.

4. The method according to claim 1, wherein the updating, by the traffic collection apparatus, a value of the second information in the first register based on the measurement value of the target performance indicator of the first packet comprises:
   adding, by the traffic collection apparatus, the measurement value of the target performance indicator of the first packet and the value not updated of the second information in the first register, to obtain an updated value of the second information; and
   replacing, by the traffic collection apparatus, the value not updated of the second information in the first register with the updated value of the second information.

5. The method according to claim 1, further comprising:
   sending, by the traffic collection apparatus, a monitoring result to a control apparatus, wherein the monitoring result comprises the value of the second information in the first register and the value of the third information in the first register.

6. The method according to claim 1, further comprising:
   sending, by the traffic collection apparatus, a monitoring result to a control apparatus, wherein the monitoring result comprises a value that is of fourth information and that corresponds to the first register and the value of the third information in the first register, the fourth information indicates an average carrying the measurement value of the target performance indicator of the monitored packet, and the value of the fourth information is calculated by the traffic collection apparatus based on the value of the second information and the value of the third information in the first register.

7. The method according to claim 5, wherein the sending, by the traffic collection apparatus, a monitoring result to a control apparatus comprises:
   sending, by the traffic collection apparatus, the monitoring result to the control apparatus periodically.

8. The method according to claim 5, wherein the sending, by the traffic collection apparatus, a monitoring result to a control apparatus comprises:
   sending, by the traffic collection apparatus, the monitoring result to the control apparatus when determining that the value of the third information in the first register is greater than a first threshold.

9. The method according to claim 8, wherein the first threshold is a preset threshold, or is a preset proportion of a sum of values of the third information in all registers of the traffic collection apparatus.

10. The method according to claim 5, wherein the sending, by the traffic collection apparatus, a monitoring result to a control apparatus comprises:
    sending, by the traffic collection apparatus, the monitoring result to the control apparatus when determining that a sum of values of the third information in all registers of the traffic collection apparatus is greater than a second threshold.

11. The method according to claim 5, further comprising:
    before the sending, by the traffic collection apparatus, a monitoring result to a control apparatus, receiving, by the traffic collection apparatus, a query request sent by the control apparatus, wherein the query request indicates the traffic collection apparatus to send the monitoring result to the control apparatus.

12. The method according to claim 5, further comprising:
    clearing, by the traffic collection apparatus, the value of the second information and the value of the third information in the first register.

13. The method according to claim 5, wherein the monitoring result is used by the control apparatus to calculate an updated value that is of the first information and that corresponds to each register in the traffic collection apparatus.

14. A traffic monitoring method, comprising:
receiving, by a control apparatus, a plurality of monitoring results sent by a traffic collection apparatus, wherein each of the plurality of monitoring results is determined by the traffic collection apparatus based on a value of second information and a value of third information in a register comprised in the traffic collection apparatus, the register further comprises first information, the first information indicates a depth of a data bucket carrying a measurement value of a target performance indicator of a monitored packet, the second information indicates an accumulated sum of the measurement value that is of the target performance indicator of the monitored packet and that matches a value of the first information in the register, and the third information indicates a quantity of packets, in one or more packets received by the traffic collection apparatus, whose measurement values of the target performance indicator match the value of the first information in the register;
determining, by the control apparatus, a plurality of values of the first information based on the plurality of monitoring results, wherein the plurality of values of the first information correspond one-to-one to a plurality of registers in the traffic collection apparatus; and
sending, by the control apparatus, the plurality of values of the first information to the traffic collection apparatus, wherein the plurality of values of the first information are for updating values of the first information in the plurality of registers in the traffic collection apparatus.

15. The method according to claim 14, wherein the receiving, by a control apparatus, a plurality of monitoring results sent by a traffic collection apparatus comprises:
receiving, by the control apparatus, a first monitoring result corresponding to a first register that is sent by the traffic collection apparatus, wherein the first monitoring result comprises a value that is of fourth information and that corresponds to the first register and a value of the third information, the value of the fourth information is calculated by the traffic collection apparatus based on a value of the second information in the first register and the value of the third information in the first register, and the fourth information indicates an average carrying a measurement value of the target performance indicator of a monitored packet.

16. The method according to claim 14, wherein the receiving, by a control apparatus, a plurality of monitoring results sent by a traffic collection apparatus comprises:
receiving, by the control apparatus, a first monitoring result corresponding to a first register that is sent by the traffic collection apparatus, wherein the first monitoring result comprises a value of the second information in the first register and a value of the third information in the first register.

17. The method according to claim 16, further comprising:
before the determining, by the control apparatus, a plurality of values of the first information based on the plurality of monitoring results, calculating, by the control apparatus based on the value of the second information and the value of the third information in the first register, a value that is of fourth information and that corresponds to the first register, wherein the fourth information indicates an average carrying a measurement value of the target performance indicator of a monitored packet; and
the determining, by the control apparatus, a plurality of values of the first information based on the plurality of monitoring results comprises:
determining, by the control apparatus based on the value that is of the fourth information and that corresponds to the first register and the value of the third information in the first register, the plurality of values of the first information that correspond to the registers in the traffic collection apparatus.

18. The method according to claim 14, wherein the determining, by the control apparatus, a plurality of values of the first information based on the plurality of monitoring results comprises:
obtaining, by the control apparatus, N pieces of updated monitoring data based on N monitoring results and historical monitoring data, wherein N is a positive integer, and is a quantity of registers comprised in the traffic collection apparatus;
determining, by the control apparatus, an $i^{th}$ piece of updated monitoring data corresponding to an ith register in the N pieces of updated monitoring data, wherein i is an integer greater than or equal to 1 and less than or equal to N; and
denoting, by the control apparatus, a value of the first information and in the $i^{th}$ piece of updated monitoring data as a value that is of the first information and that corresponds to the $i^{th}$ register.

19. The method according to claim 14, further comprising:
updating, by the control apparatus, historical monitoring data based on the plurality of monitoring results and the historical monitoring data.

20. The method according to claim 14, further comprising:
determining, by the control apparatus, probability distribution of the target performance indicator based on currently stored monitoring data.

21. A traffic collection apparatus, comprising:
a non-transitory memory storing instructions; and
a processor coupled to the non-transitory memory; wherein the instructions, when executed by the processor, cause the traffic collection apparatus to be configured to:
receive a first packet;
determine that a measurement value of a target performance indicator of the first packet matches a value of first information in a first register, wherein the first register further comprises second information and third information, the first information in the first register indicates a depth of a data bucket carrying a measurement value of the target performance indicator of a monitored packet, the second information in the first register indicates an accumulated sum of the measurement value that is of the target performance indicator of the monitored packet and that matches the value of the first information in the first register, and the third information in the first register indicates a quantity of packets, in one or more packets received, that match the value of the first information in the first register; and
update a value of the second information in the first register based on the measurement value of the target performance indicator of the first packet, and increasing a value of the third information in the first register by 1.

22. The traffic collection apparatus according to claim 21, wherein the instructions, when executed by the processor, further cause the traffic collection apparatus to be configured to:
  determine that the measurement value of the target performance indicator of the first packet falls within a value range corresponding to the value of the first information in the first register.

23. The traffic collection apparatus according to claim 21, wherein the instructions, when executed by the processor, further cause the traffic collection apparatus to be configured to:
  determine that a difference between the measurement value of the target performance indicator of the first packet and the value of the first information in the first register is less than a difference between the measurement value of the target performance indicator of the first packet and a value of the first information in another register.

24. The traffic collection apparatus according to claim 21, wherein the instructions, when executed by the processor, further cause the traffic collection apparatus to be configured to:
  add the measurement value of the target performance indicator of the first packet and the value not updated of the second information in the first register, to obtain an updated value of the second information; and
  replace the value not updated of the second information in the first register with the updated value of the second information.

25. The traffic collection apparatus according to claim 21, wherein the instructions, when executed by the processor, further cause the traffic collection apparatus to be configured to:
  send a monitoring result to a control apparatus, wherein the monitoring result comprises the value of the second information in the first register and the value of the third information in the first register.

26. A control apparatus, comprising:
  a non-transitory memory storing instructions; and
  a processor coupled to the non-transitory memory;
  wherein the instructions, when executed by the processor, cause the control apparatus to be configured to:
  receive a plurality of monitoring results sent by a traffic collection apparatus, wherein each of the plurality of monitoring results is determined by the traffic collection apparatus based on a value of second information and a value of third information in a register comprised in the traffic collection apparatus, the register further comprises first information, the first information indicates a depth of a data bucket carrying a measurement value of a target performance indicator of a monitored packet, the second information indicates an accumulated sum of the measurement value that is of the target performance indicator of the monitored packet and that matches a value of the first information in the register, and the third information indicates a quantity of packets, in one or more packets received by the traffic collection apparatus, whose measurement values of the target performance indicator match the value of the first information in the register;
  determine a plurality of values of the first information based on the plurality of monitoring results, wherein the plurality of values of the first information correspond one-to-one to a plurality of registers in the traffic collection apparatus; and
  send the plurality of values of the first information to the traffic collection apparatus, wherein the plurality of values of the first information are for updating values of the first information in the plurality of registers in the traffic collection apparatus.

27. The control apparatus according to claim 26, wherein the instructions, when executed by the processor, further cause the control apparatus to be configured to:
  receive a first monitoring result corresponding to a first register that is sent by the traffic collection apparatus, wherein the first monitoring result comprises a value that is of fourth information and that corresponds to the first register and a value of the third information, the value of the fourth information is calculated by the traffic collection apparatus based on a value of the second information in the first register and the value of the third information in the first register, and the fourth information indicates an average carrying a measurement value of the target performance indicator of a monitored packet.

28. The control apparatus according to claim 26, wherein the instructions, when executed by the processor, further cause the control apparatus to be configured to:
  receive a first monitoring result corresponding to a first register that is sent by the traffic collection apparatus, wherein the first monitoring result comprises a value of the second information in the first register and a value of the third information in the first register.

29. The control apparatus according to claim 26, wherein the instructions, when executed by the processor, further cause the control apparatus to be configured to:
  update historical monitoring data based on the plurality of monitoring results and the historical monitoring data.

30. The control apparatus according to claim 26, wherein the instructions, when executed by the processor, further cause the control apparatus to be configured to:
  determine probability distribution of the target performance indicator based on currently stored monitoring data.

* * * * *